(12) United States Patent
Yamamoto et al.

(10) Patent No.: US 8,111,683 B2
(45) Date of Patent: Feb. 7, 2012

(54) BASE STATION AND MOBILE STATION FOR OFDMA CELLULAR SYSTEM

(75) Inventors: Tomonori Yamamoto, Kokubunji (JP);
Katsuhiko Tsunehara, Hachioji (JP);
Satoshi Tamaki, Kokubunji (JP); May Takada, Koganei (JP); Mikio Kuwahara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 521 days.

(21) Appl. No.: 12/391,920

(22) Filed: Feb. 24, 2009

(65) Prior Publication Data

US 2009/0232236 A1 Sep. 17, 2009

(30) Foreign Application Priority Data

Mar. 17, 2008 (JP) ................... 2008-067994

(51) Int. Cl.
*H04J 3/06* (2006.01)
*H04J 3/16* (2006.01)
*H04L 1/00* (2006.01)
(52) U.S. Cl. .................. 370/350; 370/252; 370/504
(58) Field of Classification Search ............ 370/503, 370/504, 509, 252
See application file for complete search history.

(56) References Cited

U.S. PATENT DOCUMENTS

| 7,813,311 B2 * | 10/2010 | Dick et al. ............... 370/324 |
| 2002/0093940 A1 * | 7/2002 | Toskala et al. .......... 370/350 |
| 2003/0153275 A1 * | 8/2003 | Oh et al. ................ 455/67.6 |
| 2004/0042431 A1 * | 3/2004 | Ishikawa ................ 370/337 |
| 2006/0227812 A1 * | 10/2006 | Vrcelj et al. ........... 370/503 |
| 2009/0190675 A1 * | 7/2009 | Ling et al. ............ 375/260 |
| 2009/0225662 A1 * | 9/2009 | Tsai et al. ............ 370/242 |

FOREIGN PATENT DOCUMENTS

| JP | 2004-120586 | * | 4/2004 |
| JP | 2006-140823 | * | 6/2006 |

OTHER PUBLICATIONS

3GPP TS 36.213 V1.2.0(May 2007).

* cited by examiner

*Primary Examiner* — Warner Wong
(74) *Attorney, Agent, or Firm* — Brundidge & Stanger, P.C.

(57) ABSTRACT

In a cellular radio communication system, a base station or a mobile station has a TA (Time Alignment)-range-out detection function, so that when a TA-range-out state that is unable to compensate with a guard interval is detected, the transmission condition of an uplink signal at the mobile station is changed by the mobile station autonomously or by the base station and the mobile station cooperatively.

16 Claims, 22 Drawing Sheets

BASE STATION AND MOBILE STATION FOR OFDMA CELLULAR SYSTEM

CLAIM OF PRIORITY

The present patent application claims priority from Japanese patent application JP 2008-067994, filed on Mar. 17, 2008, the content of which is hereby incorporated by reference into this application.

BACKGROUND OF THE INVENTION (1) Field of the Invention

The present invention relates to a base station and a mobile station in a cellular radio communication system, and more particularly, to a base station and a mobile station to be applied to a cellular radio communication system of OFDM (Orthogonal Frequency Division Multiplexing).

(2) Description of the Related Art

The OFDM is a communication method for multiplexing a plurality of orthogonal carriers by performing digital modulation. A transmission station converts a digital signal generated in a frequency domain into a baseband OFDM signal in a time domain by IFFT (Inverse Fast Fourier Transform), converts the baseband OFDM signal into an RF signal having a radio band frequency, and transmits the RF signal through an antenna. A reception station converts the RF signal received by an antenna into the baseband OFDM signal, and converts the baseband OFDM signal in the time domain into a signal in the frequency domain by FFT (Fast Fourier Transform) to reproduce the original digital signal.

More specifically, the transmission station converts a data bit sequence to be transmitted into a sequence of complex modulation symbols, converts the sequence of complex modulation symbols into N parallel complex symbols by serial-to-parallel conversion, converts the N parallel complex symbols into parallel signals en bloc by IDFT (Inverse Discrete Fourier Transform), converts the parallel signals into a serial signal and converts the serial signal into an RF signal.

As the third-generation CDMA (Code Division Multiple Access) mobile communication system enables communication of multimedia information through the IP (Internet Protocol) network, there is a growing need for wider-band communication service. Accordingly, in the next-generation cellular radio communication system using the OFDM, it will be general to support wideband communication such as best-effort data communication, VoIP (Voice over IP) communication, and the distribution of streaming information such as video pictures. Further, in order to deal with increase in the amount of transmission data from terminals, OFDMA (Orthogonal Frequency Division Multiple Access) using the OFDM also to uplink access is being studied.

In the OFDM cellular radio communication system, there are formed as communication channels between a base station and a mobile station, a traffic or data channel for transmitting user data, and various control channels such as an access channel for establishing an uplink toward the base station from the terminal, a control channel for transmitting control information through the uplink and a downlink toward the mobile station from the base station, and a broadcast channel for notifying channel assignment information and system information from the base station to the mobile station.

In the case where the OFDMA is applied to upward access, a control function of adjusting the uplink data transmission timing of each mobile station is required in order to receive upward data from the mobile station in synchronization with a reference clock (base clock) of the base station. Because, owing to the restriction in the configuration of the reception unit for the base station, it is difficult for the base station to perform individual reception control for each of unspecified number of mobile stations in accordance with the signal reception timing gap, but signal reception processing becomes easier when transmission signals from a plurality of mobile stations are controlled so as to synchronize with the base clock of the base station. In this case, TA (Time Alignment) control to feed back, from the base station to each mobile station, a control signal for correcting data transmission timing of the mobile station is required.

In the TA control, each mobile station transmits to the base station a synchronization signal indicating the reference timing of data transmission at the mobile station, by using a control channel dedicated to TA. Instead of using the channel dedicated to TA, the synchronization signal may be inserted in the data channel at regular intervals. The base station calculates the gap between the synchronization signal received from each mobile station and the base clock of the base station, and feeds back a transmission timing control signal to each mobile station at regular control intervals so that the gap becomes zero. Each mobile station corrects the transmission timing of data on the uplink channel according to a TA control signal which is the transmission timing control signal received from the base station.

According to the TA control disclosed in 3GPP: "Evolved Universal Terrestrial Radio Access (E-UTRA); Physical layer procedures" (TS 36.213 (v1.20), 2007.06.21), the base station adjusts the synchronization signal generation timing of the mobile station in the sample clock unit for each control period. By adjusting the synchronization signal of the mobile station little by little in this manner, it is possible to synchronize the data transmission timing of the mobile station with reception timing of the base station without interrupting communication.

Here, it is assumed that a communication environment changes with the movement of the mobile station and synchronization between the mobile station and the base station is lost. If the synchronization gap remains within the duration of the guard interval (GI) at the receiving station, deviation of the synchronization does not cause a serious problem. However, if the communication environment changes suddenly, such a large deviation that the time alignment control cannot immediately correct the synchronization may occur, that is, the data transmission timing may be out of normal TA control.

For example, in a street of office buildings, an uplink radio wave transmitted from the mobile station reflects on walls of buildings. Therefore, depending on the positional relation between the mobile station and the base station, there occur cases where a direct wave of the uplink signal reaches the base station, both the direct wave and an indirect wave reach the base station, and the direct wave is blocked because of shadowing so that only the indirect wave reaches the base station.

When the mobile station moves, for example, from a communication environment in which only the indirect wave can reach the base station to another position at which the base station can be seen without obstruction, the propagation delay time of the uplink signal changes suddenly. As a result, such a large loss of synchronization that cannot be compensated by the time alignment control occurs depending on the circumstances. A similar loss of synchronization occurs also in a downlink signal transmitted from the base station to the mobile station.

SUMMARY OF THE INVENTION

In the OFDMA, each frequency band generated by the frequency division is further divided in the time domain into a plurality of time segments and the frequency band is assigned to each mobile station in unit of the time segment, so that the same frequency band is shared among a plurality of mobile stations. For this reason, when a large loss of synchronization occurs in one mobile station, there is possibility of occurring inter-symbol interference between adjacent time segments in the same frequency band.

When such a large loss of synchronization occurs, the mobile station cannot adjust the transmission timing promptly because the uplink communication of the OFDMA does not make it a precondition for the mobile station to autonomously adjust an uplink transmission time. Since the mobile station adjusts the transmission time little by little in response to the time alignment (TA) control from the base station, the loss-of-synchronization state remains after the occurrence of the synchronization loss. In this case, the interference with the adjacent segment may continue until the synchronization gap falls within the guard interval (GI).

It is an object of the present invention to provide a base station and a mobile station capable of reducing an adverse effect on uplink communication of other mobile stations until a signal transmission time from the mobile station is corrected when such a loss-of-synchronization that cannot be immediately compensated by time alignment (TA) control (hereinafter referred to as "TA-range-out") occurs in a cellular radio communication system.

It is another object of the invention to provide a base station and a mobile station capable of maintaining the communication of the mobile station even when a TA-range-out occurs in a cellular radio communication system.

In order to attain the above object, according to the invention, a base station or a mobile station has a TA-range-out detection function. When a TA-range-out is detected, the transmission condition of an uplink signal to be transmitted from the mobile station to the base station is changed by the mobile station autonomously or by the base station and the mobile station cooperatively. Here, as the transmission condition, for example, the transmission power of the uplink signal, a channel to be used in the uplink data transmission, the operation mode of a modulator of the mobile station, etc. are included.

The transmission power of the uplink signal can be changed by a transmission power control (TPC) signal outputted from a transmission power control unit (TPC control unit) of the mobile station. The data channel to be used in the uplink data transmission can be changed by a channel assignment signal outputted from an uplink scheduler of the base station. Further, the operation mode of the modulator can be changed by an modulation coding scheme (MCS) control parameters for specifying the modulation scheme, coding scheme, and CP (Cyclic Prefix) length of the modulator.

When a TA-range-out is detected, an adverse effect on the communication of other mobile stations can be reduced, for example, by reducing the transmission power of the mobile station in a TA-range-out state. The channel assigned to the TA-range-out mobile station may be changed to a different channel. Further, the communication interference tolerance of the mobile station may be enhanced by changing the modulation coding scheme (MCS) control parameters so as to reduce the data transmission rate of the TA-range-out state station.

More specifically, a base station according to the invention comprises: an antenna for communicating radio frequency (RF) signals with a mobile station; a front end unit for converting the RF signal received by the antenna into an uplink baseband signal, and converting a downlink baseband signal to be transmitted to the mobile station into an RF signal to output the RF signal to the antenna; a demodulation processing unit for demodulating the uplink baseband signal outputted from the front end unit; a modulation processing unit for multiplexing a control signal and a downlink data signal to be transmitted to the mobile station and converting into a downlink baseband signal to output the downlink baseband signal to the front end unit; an uplink-timing detector for detecting a reception timing gap of an uplink signal transmitted by the mobile station, from the uplink baseband signal outputted from the front end unit, a TA control signal generator for generating a TA control signal based on the uplink signal reception timing gap detected by the uplink-timing detector and outputting the TA control signal to the modulation processing unit; a timing-out detector for generating a TA-range-out signal indicating whether the mobile station is in the state of out of normal TA control range (TA-range-out) or not, according to a result of a comparison between the uplink signal reception timing gap outputted from the uplink-timing detector and a predetermined threshold; and a transmission condition change signal generator which generates a transmission condition change signal for changing a transmission condition of the uplink signal in the mobile station based on the TA-range-out signal outputted from the timing-out detector and outputs the transmission condition change signal as a control signal to the modulation processing unit, wherein the downlink baseband signal outputted from the modulation processing unit to the front end unit includes the transmission condition change signal and the TA control signal.

The transmission condition change signal generator is composed of, for example, a TPC signal generator which generates, as the transmission condition change signal, a TPC signal for controlling a transmission power of the mobile station according to signal quality information, e.g. channel quality indication signal outputted from the demodulation processing unit. In this case, the TPC signal generator generates when the TA-range-out signal outputted from the timing-out detector indicates the TA-range-out state, a TPC signal instructing the mobile station in the TA-range-out state to reduce the transmission power to a predetermined minimum power.

The transmission condition change signal generator may be composed of a modulation coding scheme (MCS) control signal generator which generates an MCS control signal including control parameters for specifying at least a modulation scheme and a coding rate of the mobile station, according to the signal quality information outputted from the demodulation processing unit. In this case, the MCS control signal generator degrades the control parameters of the MCS control signal to be transmitted to the mobile station when the TA-range-out signal indicates the TA-range-out state, and outputs the degraded MCS control signal to the modulation processing unit.

The transmission condition change signal generator may be composed of an uplink scheduler which assigns an uplink channel to the mobile station according to the signal quality information outputted from the demodulation processing unit and outputs a control signal indicating the assigned channel to the modulation processing unit. In this case, the uplink scheduler changes the channel to be assigned to mobile station when the TA-range-out signal indicates the TA-range-out state.

In the case of a system configuration in which each mobile station has a TA-range-out detection function and the mobile station having detected a TA-range-out state transmits a TA-range-out signal to the base station, the transmission condition change signal generator can degrade the transmission condition of mobile station in the TA-range-out state, by receiving the TA-range-out signal outputted from the demodulation processing unit instead of the TA-range-out detector.

In the case of a system configuration in which the base station has the TA-range-out detection function, the mobile station according to the invention comprises: an antenna for communicating RF signals with the base station; a front end unit for converting the RF signal received by the antenna into an downlink baseband signal, and converting an uplink baseband signal to be transmitted to the base station into an RF signal to output the RF signal to the antenna; a demodulation processing unit for demodulating the downlink baseband signal outputted from the front end unit, and outputting a demodulated downlink data signal and plural kinds of control signals transmitted from the base station; a modulation processing unit for multiplexing a control signal and an uplink data signal to be transmitted to the base station, and converting into an uplink baseband signal to output the uplink baseband signal to the front end unit; a transmission condition control unit for controlling a transmission condition of an uplink signal in accordance with a specific control signal outputted from the demodulation processing unit; and a TA-range-out detector for outputting a TA-range-out indication signal indicating that the uplink signal of the mobile station is in a TA-range-out state at the base station, based on a TA-range-out notification signal outputted from the demodulation processing unit, wherein the transmission condition control unit degrades, in response to the TA-range-out indication signal, the transmission condition having been determined in accordance with the specific control signal.

The transmission condition control unit is composed of, for example, a transmission power control (TPC) unit for controlling a transmission power of the uplink signal to be transmitted from the front end unit according to a TPC signal outputted from the demodulation processing unit. In this case, the transmission power control unit reduces the transmission power of the uplink signal to a predetermined minimum power in response to the TA-range-out indication signal.

The transmission condition control unit may be composed of a modulation coding scheme (MCS) control unit for determining an operation mode of the modulation processing unit according to an MCS control signal outputted as one of the control signals from the demodulation processing unit. In this case, the MCS control unit switches the operation mode of the modulation processing unit to a predetermined degraded operation mode in response to the TA-range-out indication signal.

In the case of a system configuration in which each mobile station has the TA-range-out detection function, the mobile station according to the invention comprises: an antenna for communicating RF signals with the base station; a front end unit for converting the RF signal received by the antenna into an downlink baseband signal, and converting an uplink baseband signal to be transmitted to the base station into an RF signal to output the RF signal to the antenna; a demodulation processing unit for demodulating the downlink baseband signal outputted from the front end unit, and outputting a demodulated downlink data signal and plural kinds of control signals transmitted from the base station; a modulation processing unit for multiplexing control signals and an uplink data signal to be transmitted to the base station and converting into an uplink baseband signal to output the uplink baseband signal to the front end unit; a downlink-timing detector for generating at predetermined intervals, a reception timing adjustment signal indicating a reception timing adjustment amount for synchronizing downlink signal reception timing with reference timing of the base station, based on a reception signal of a synchronization channel outputted from a front end unit; a timing-out detector for generating a TA-range-out indication signal when the reception timing adjustment amount indicated by the reception timing adjustment signal exceeds a predetermined threshold of time alignment (TA) control; and a TA-range-out notification signal generator which generates a TA-range-out notification signal according to the TA-range-out indication signal outputted from the timing-out detector and outputs the TA-range-out notification signal to the modulation processing unit, wherein the modulation processing unit outputs the uplink baseband signal including the TA-range-out notification signal to the front end unit.

Instead of providing the TA-range-out notification signal generator in the mobile station, the TA-range-out signal generated by the TA-range-out detector may be inputted to the transmission condition control unit, and the transmission condition control unit may degrade the transmission condition in response to the TA-range-out signal generated by the TA-range-out detector.

According to the invention, it is possible to reduce signal interference in other mobile stations until the mobile station in the TA-range-out state completes synchronization correction. Consequently, it is possible to improve the robustness of communication maintenance of mobile stations.

DETAILED DESCRIPTION OF THE PREFERRED EMBODIMENTS

Figure 1:
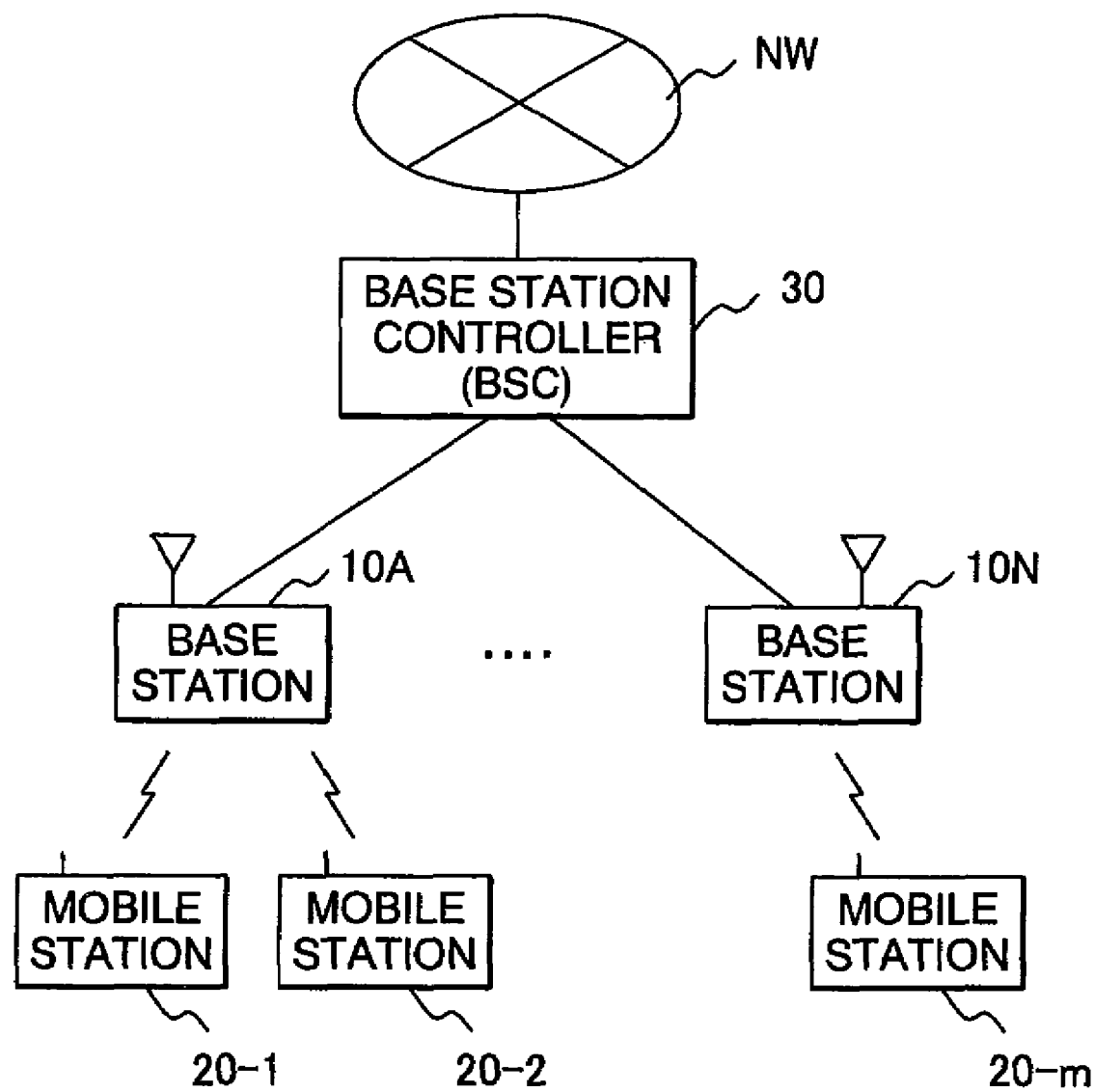
FIG. 1 is a diagram showing the configuration of an OFDM cellular radio communication system to which the present invention is applied.

As shown in FIG. 1, an OFDM cellular radio communication system is composed of a base station controller 30 connected to a network NW, a plurality of base stations 10 (10A, ..., 10N) connected to the base station controller 30 through wired lines, and an indefinite number of mobile stations 20 (20-1, 20-2, ..., 20-$m$) which communicate with the base stations 10 through radio channels. Each mobile station 20 communicates, through a specific base station 10 located within communication range, with another mobile station or another communication apparatus such as a terminal or a server connected to the network NW.

Figure 2:
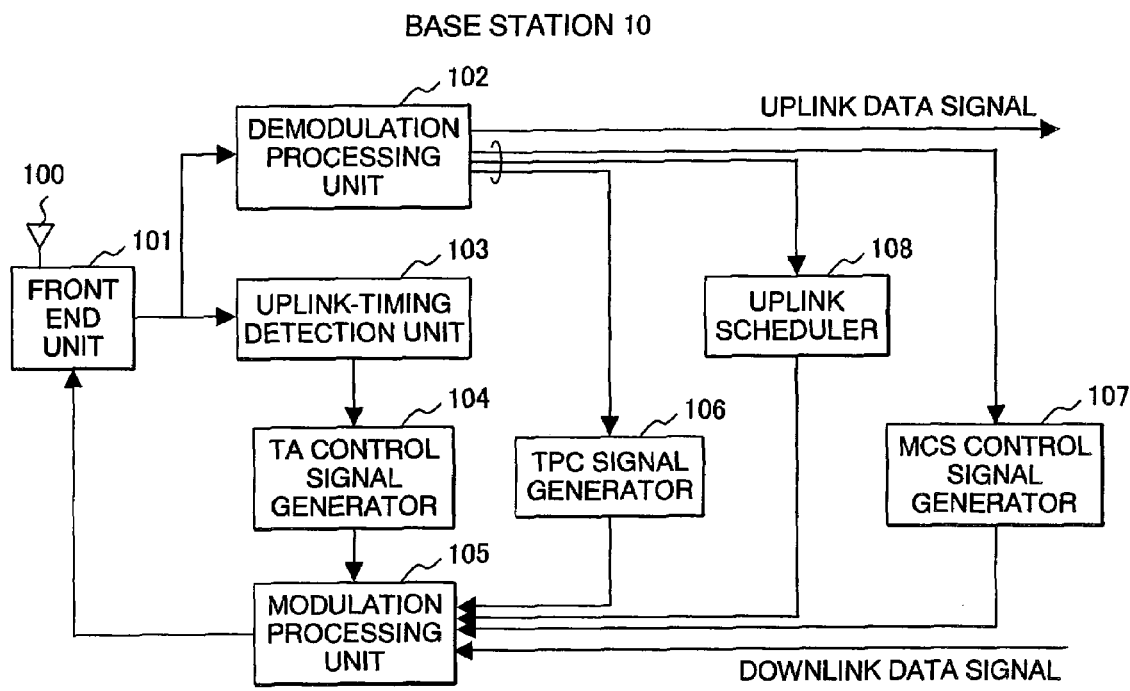
FIG. 2 is a diagram showing basic constituents of a radio transmission/reception unit provided in a base station 10.

FIG. 2 shows basic constituents of a radio transmission/reception unit provided in the base station 10.

The radio transmission/reception unit of the base station 10 includes a front end unit 101 connected to an antenna 100, a demodulation processing unit 102 and a modulation processing unit 105 connected to the front end unit 101, an uplink-timing detection unit 103 connected to the front end unit 101, and a time alignment (TA) control signal generator 104 connected to the uplink-timing detection unit 103. The radio transmission/reception unit further includes a transmission power control (TPC) signal generator 106, a modulation coding scheme (MCS) control signal generator 107, and an uplink scheduler 108, each of which is connected to the demodulation processing unit 102.

The front end unit 101 performs filtering on a radio frequency (RF) signal received from the antenna 100 and performs frequency conversion to output a baseband OFDM signal. The baseband OFDM signal is inputted to the demodulation processing unit 102 and the uplink-timing detection unit 103.

The demodulation processing unit 102 detects a sequence of data bits from the uplink baseband OFDM signal inputted from the front end unit 100, and forwards uplink data transmitted from each mobile station to a control unit (not shown) of the base station. Further, the demodulation processing unit 102 detects reception signal quality from the baseband OFDM signal, and outputs uplink signal quality information indicating reception signal quality for each mobile station to the TPC signal generator 106, the MCS control signal generator 107, and the uplink scheduler 108.

The TPC signal generator 106 generates a transmission power control (TPC) signal according to the signal quality indicated by the uplink signal quality information, and outputs it to the modulation processing unit 105. The MCS control signal generator 107 determines DRC (Data Rate Control) or CQI (Channel Quality Indicator) to be an MCS indicator according to the signal quality indicated by the uplink signal quality information, and generates an MCS control signal including a plurality of control parameters for specifying the operation mode of the modulation processing unit 105, e.g., a modulation scheme, a coding rate, a CP (Cyclic Prefix) length, and the like, to output it to the modulation processing unit 105. The uplink scheduler 108 generates an uplink channel assignment signal for specifying an uplink channel (frequency band and segment) to be used by each mobile station, according to the signal quality indicated by the uplink signal quality information, and outputs it to the modulation processing unit 105.

The TPC signal generator 106, the MCS control signal generator 107, and the uplink scheduler 108 are constituents of a transmission condition change signal generating unit in the base station according to the invention.

The uplink-timing detection unit 103 detects the uplink signal reception timing of a segment including a synchronization signal from the baseband OFDM signal outputted from the front end unit 101, and outputs the gap between the uplink signal reception timing and the reference timing (base timing) of the base station to the TA control signal generator 104. The TA control signal generator 104 determines a TA control value to be notified to each mobile station, according to the timing gap inputted from the uplink-timing detection unit 103, and outputs it as a TA control signal to the modulation processing unit 105.

The modulation processing unit 105 multiplexes downlink data outputted from the control unit of the base station and control signals outputted from the TA control signal generator 104, the TPC signal generator 106, the MCS control signal generator 107, and the uplink scheduler 108, and outputs the multiplexed signals as a downlink baseband OFDM signal to the front end unit 101. In this case, the data signal and the control signals are time-division multiplexed on a same frequency channel. These signals may be frequency-division multiplexed on different frequency channels. The front end unit 101 converts the downlink baseband OFDM signal inputted from the modulation processing unit 105 into an RF signal, and outputs the RF signal after amplified in power to the antenna 100.

The base station 10 according to the invention has the function of preventing or reducing inter-symbol interference in adjacent segments of the same frequency band when the uplink transmission timing of a mobile station gets largely a loss-of-synchronization, as will be described below, by changing the transmission condition of an uplink signal of the mobile station, e.g., a transmission power, a use channel, or a transmission rate.

Figure 3A:
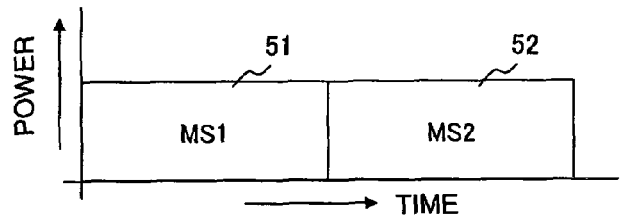
FIGS. 3A to 3C are diagrams for illustrating a problem at the time of a TA-range-out occurrence and an example of changing one of uplink signal transmission conditions in the mobile station performed by the invention.

FIG. 3A shows that uplink data of mobile stations MS1 and MS2 are transmitted normally in adjacent segments 51 and 52 in the same frequency band. For example, when the communication environment of the mobile station MS2 changes suddenly and such a large loss-of-synchronization (hereinafter referred to as TA-range-out) that cannot be immediately corrected by TA control occurs, the transmission data of the segment 52 received by the base station shifts on the time axis.

Figure 3B:
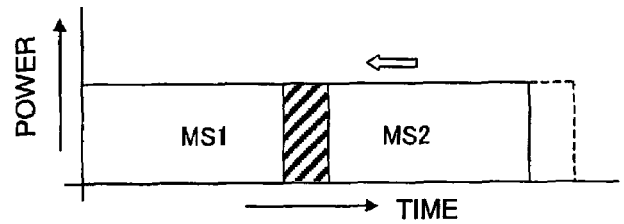
Figure 3C:
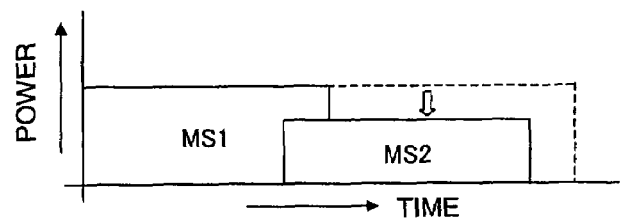

Although the TA-range-out may occur in the course of the segment 52, there is possibility depending on circumstances, that the segments 51 and 52 partially overlap as indicated by a shaded area in FIG. 3B, so that signal interference may occur between the transmission data of MS1 and the transmission data of MS2. A feature of the invention resides in that, when the TA-range-out occurs in the mobile station MS2, the transmission power of the mobile station MS2 is reduced as shown in FIG. 3C, thereby reducing the signal interference between the mobile stations MS1 and MS2.

Figure 4A:
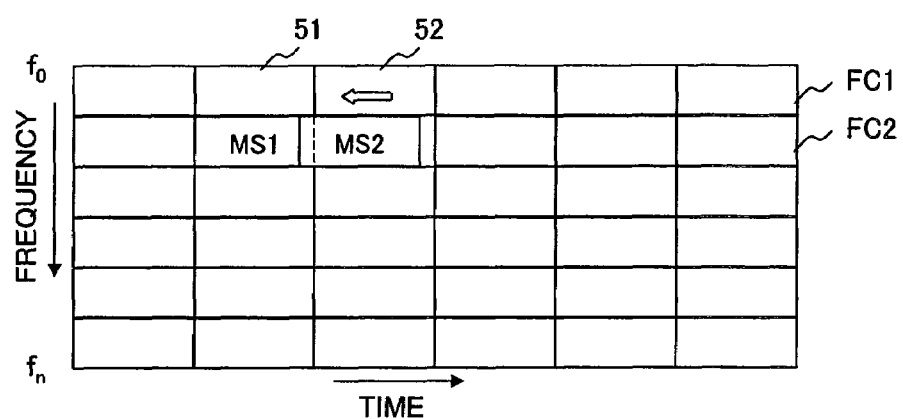
FIGS. 4A to 4B are diagrams for illustrating another example of changing the uplink signal transmission condition in the mobile station performed by the invention.
Figure 4B:
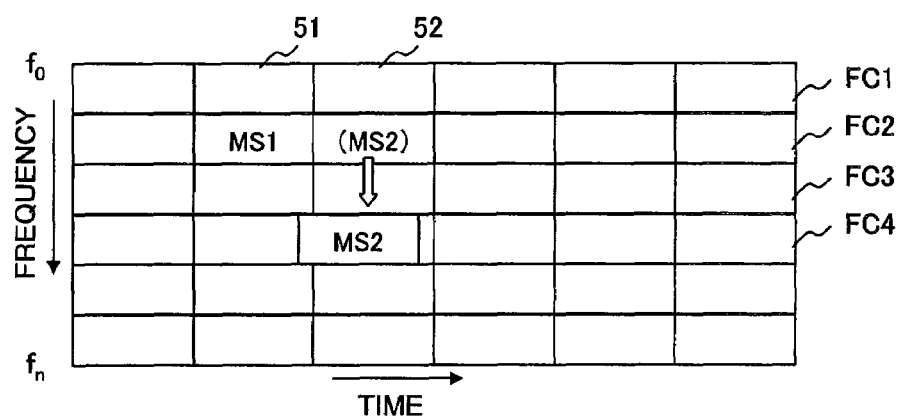

FIG. 4A shows that the TA-range-out occurs in the uplink data transmitted in the segment 52 of a frequency band FC2 by the mobile station MS2. According to another feature of the invention, when the TA-range-out occurs in the mobile station MS2, the channel to be used by the mobile station MS2 is changed as shown in FIG. 4B, thereby reducing the signal interference between the mobile stations MS1 and MS2. Although the segment 52 to be used by the mobile station MS2 is switched from the frequency band FC2 to a frequency band FC4 in FIG. 4B, the segment to be used may be changed in addition to the switching of frequency band. The use channel for the mobile station MS2 is changed by the uplink scheduler 108.

Hereinafter, several embodiments of the invention will be described with reference to the accompanying drawings. In the following embodiments, the same reference numerals as in FIG. 2 are applied to constituents of the base station 10 to simplify the description of the same constituents as in FIG. 2. Further, constituents of the same names but different in function have reference numerals with alphabetical suffixes such as 106A. The same applies to the mobile station 20.

First Embodiment

Figure 5:
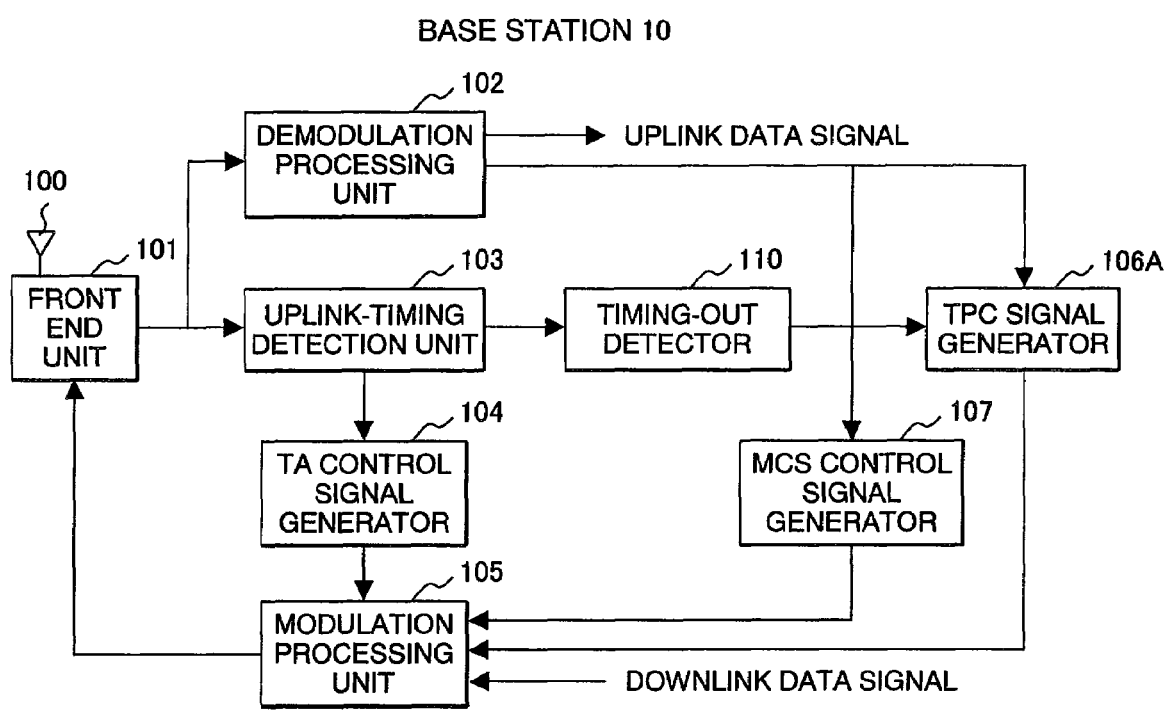
FIG. 5 is a diagram showing the configuration of a radio transmission/reception unit for the base station 10 applied to the first embodiment of the invention.

FIG. 5 shows the configuration of a radio transmission/reception unit for the base station 10 applied to the first embodiment of the invention. In FIG. 5, the uplink scheduler 108 is not shown for simplicity.

In the first embodiment, the base station 10 is provided with a timing-out detector 110 having a buffer memory for storing a timing gap, between the uplink-timing detection unit 103 and a TPC signal generator 106A.

Figure 6:
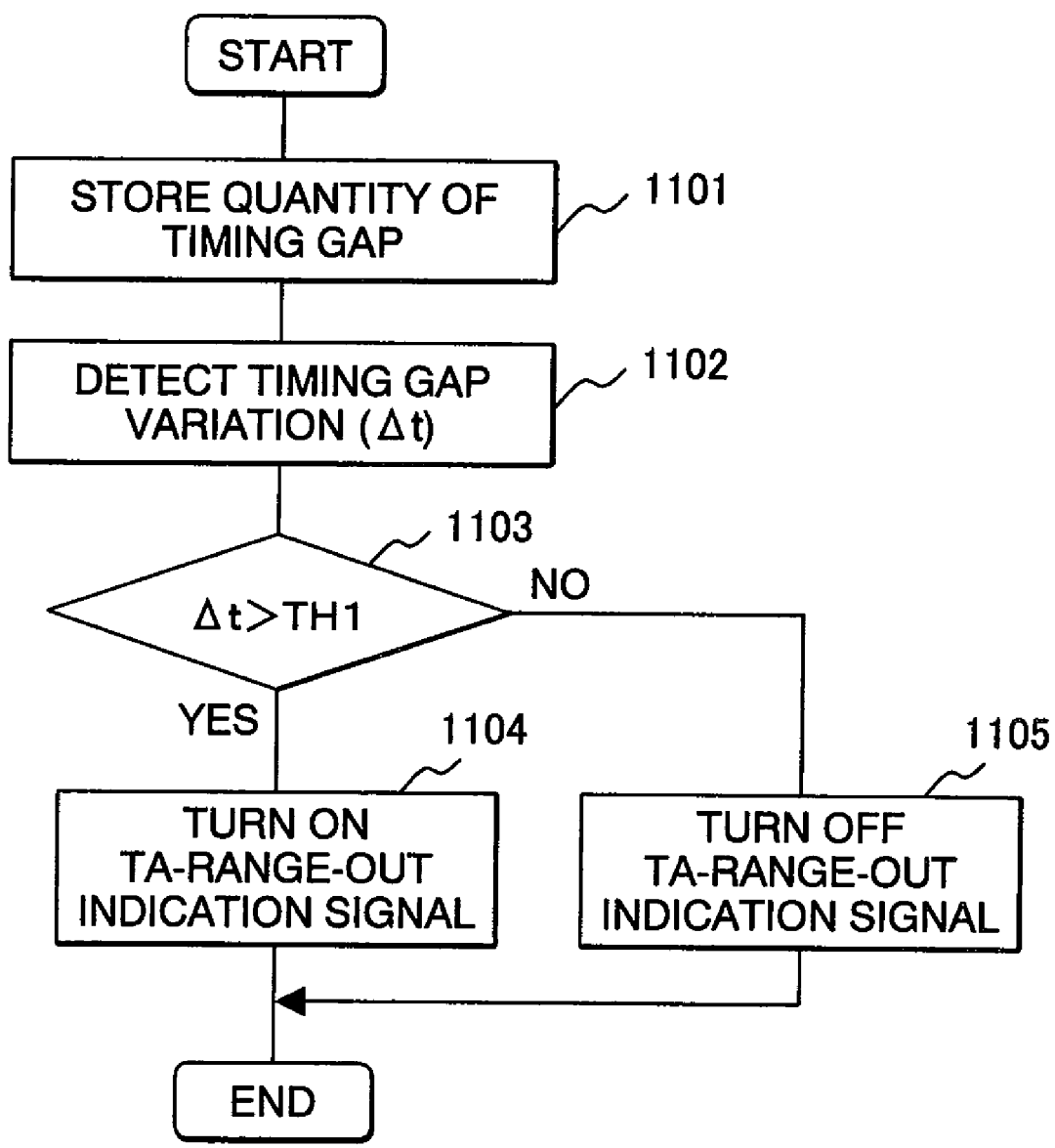
FIG. 6 is a flowchart showing the operation of a timing-out detector 110 provided in the base station of the first embodiment.

The gap between the uplink signal reception timing and the reference timing of the base station is inputted to the timing-out detector 110 from the uplink-timing detection unit 103. When the timing gap is inputted from the uplink-timing detection unit 103, the timing-out detector 110 determines the presence or absence of TA-range-out by a procedure shown in FIG. 6. Upon detecting the TA-range-out, the timing-out detector 110 turns on a TA-range-out indication signal to be supplied to the TPC signal generator 106A.

That is, the timing-out detector 110 stores a timing gap which is newly inputted from the uplink-timing detection unit 103 in the buffer memory (step 1101), and detects the variation (difference) Δt between the immediately preceding timing gap read out from the buffer memory and the new timing gap (1102). The timing-out detector 110 compares the variation Δt with a preset threshold TH1 (1103). If the comparison result is Δt>TH1, the timing-out detector 110 turns on the TA-range-out indication signal (1104). If the comparison result is Δt≦TH1, the timing-out detector 110 turns off the TA-range-out indication signal (1105).

Figure 7:
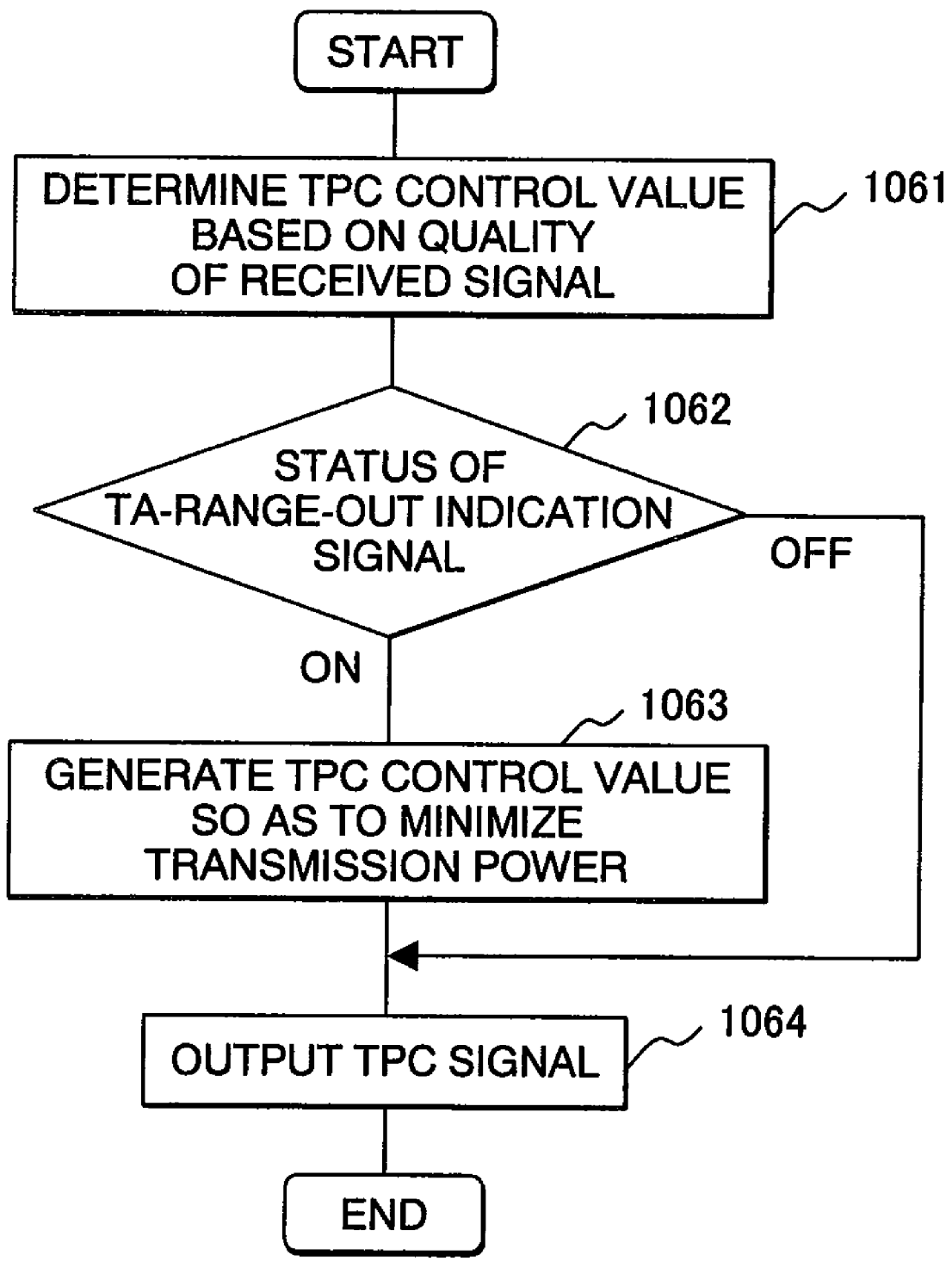
FIG. 7 is a flowchart showing the operation of a TPC signal generator 106 included in the base station of the first embodiment.

In this embodiment, the TPC signal generator 106A generates a TPC signal by a procedure shown in FIG. 7. That is, the TPC signal generator 106A determines, according to reception signal quality inputted from the demodulation processing unit 102, a TPC control value for approaching the reception signal quality to a preset target value (1061), and checks the status of the TA-range-out indication signal outputted from the timing-out detector 110 (1062).

If the TA-range-out indication signal is in the OFF state, the TPC signal generator 106A outputs the TPC control value generated in step 1061 as a TPC signal to the modulation processing unit 105 (1064). If the TA-range-out indication signal is in the ON state, the TPC signal generator 106A generates a TPC control value for reducing the transmission power of the mobile station to a predetermined minimum power (1063), and outputs the TPC control value as a TPC signal to the modulation processing unit 105 (1064).

That is, in the first embodiment, when the base station detects the TA-range-out of the mobile station, the transmission power of the mobile station in the TA-range-out state is reduced to the minimum power in accordance with the TPC signal as illustrated in FIG. 3, thereby preventing communication of other mobile stations from interfering. The minimum power value is controlled to be within a range in which the mobile station in the TA-range-out state can communicate with the base station 10.

Figure 8:
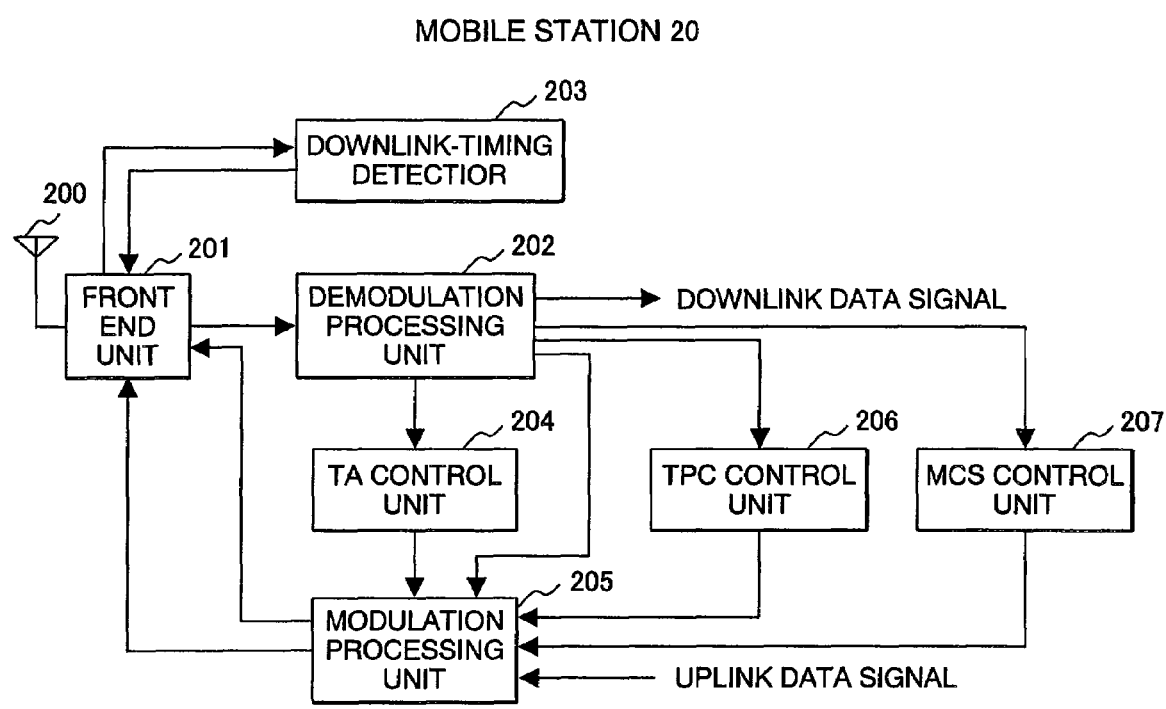
FIG. 8 is a diagram showing the configuration of a radio transmission/reception unit for a mobile station 20 applied to the first embodiment of the invention.

FIG. 8 shows the configuration of a radio transmission/reception unit for the mobile station 20 applied to the first embodiment.

The radio transmission/reception unit of the mobile station 20 includes a front end unit 201 connected to an antenna 200, a demodulation processing unit 202 and a modulation processing unit 205 connected to the front end unit 201, and a downlink-timing detector 203 connected to the front end unit 201. The radio transmission/reception unit further includes a TA control unit 204, a TPC control unit 206, and an MCS control unit 207, each of which is connected between the demodulation processing unit 202 and the modulation processing unit 205.

The front end unit 201 performs filtering on an RF signal received from the antenna 200, and generates a baseband OFDM signal by frequency conversion to output it to the demodulation processing unit 202 and the downlink-timing detector 203. The downlink-timing detector 203 extracts, from the baseband OFDM signal inputted from the front end unit 201, reception-standby-time information transmitted through a synchronization channel, and outputs a reception timing adjustment signal indicating an adjustment amount for synchronizing downlink signal reception timing with the base station to the front end unit 201.

The demodulation processing unit 202 demodulates a sequence of data bits from the baseband OFDM signal inputted from the front end unit 201, and forwards downlink data extracted from a channel assigned to each mobile station 20 to a control unit (not shown) of the mobile station. Further, the demodulation processing unit 202 outputs a TA control signal to the TA control unit 204, a TPC signal to the TPC control unit 206, an MCS control signal to the MCS control unit 207, and a channel assignment signal to the modulation processing unit 205. These control signals are received through a control channel.

Upon receiving the TA control signal from the demodulation processing unit 202, the TA control unit 204 outputs an uplink transmission timing control signal generated in accordance with the TA control signal to the modulation processing unit 205. Upon receiving the TPC signal from the demodulation processing unit 202, the TPC control unit 206 outputs a transmission power control value corresponding to the TPC signal to the modulation processing unit 205. Further, upon receiving the MCS control signal from the demodulation processing unit 202, the MCS control unit 207 outputs MCS control parameters corresponding to the MCS control signal to the modulation processing unit 205.

The modulation processing unit 205 converts an uplink data signal outputted from the control unit and the control signals such as the MCS control parameters into an uplink baseband OFDM data signal in accordance with a transmission condition such as modulation scheme, coding scheme, CP length, specified by the MCS control parameters inputted from the demodulation processing unit 202. The uplink baseband OFDM data signal is arranged to a channel specified by the channel assignment signal and outputted to the front end unit 201 at timing according to the uplink transmission timing control signal inputted from the TA control unit 204. The uplink data signal and the control signals are multiplexed to respective segments on the same frequency channel by time-division multiplexing and transmitted out for each segment. These signals may be multiplexed by frequency-division multiplexing. Further, the modulation processing unit 205 controls a power amplifier of the front end unit 201 according to the transmission power control value inputted from the TPC control unit 206.

The front end unit 201 converts the uplink baseband OFDMA signal outputted from the modulation processing unit 205 into an RF signal, and transmits the RF signal through the antenna 200. In this embodiment, since the TPC control unit 206 controls the power amplifier when the TA-range-out occurs in the uplink data from the mobile station 20, so as to minimize the output power in accordance with the TPC signal from the base station, the front end unit 201 transmits the uplink data with the transmission power reduced as shown in FIG. 3C.

Second Embodiment

Figure 9:
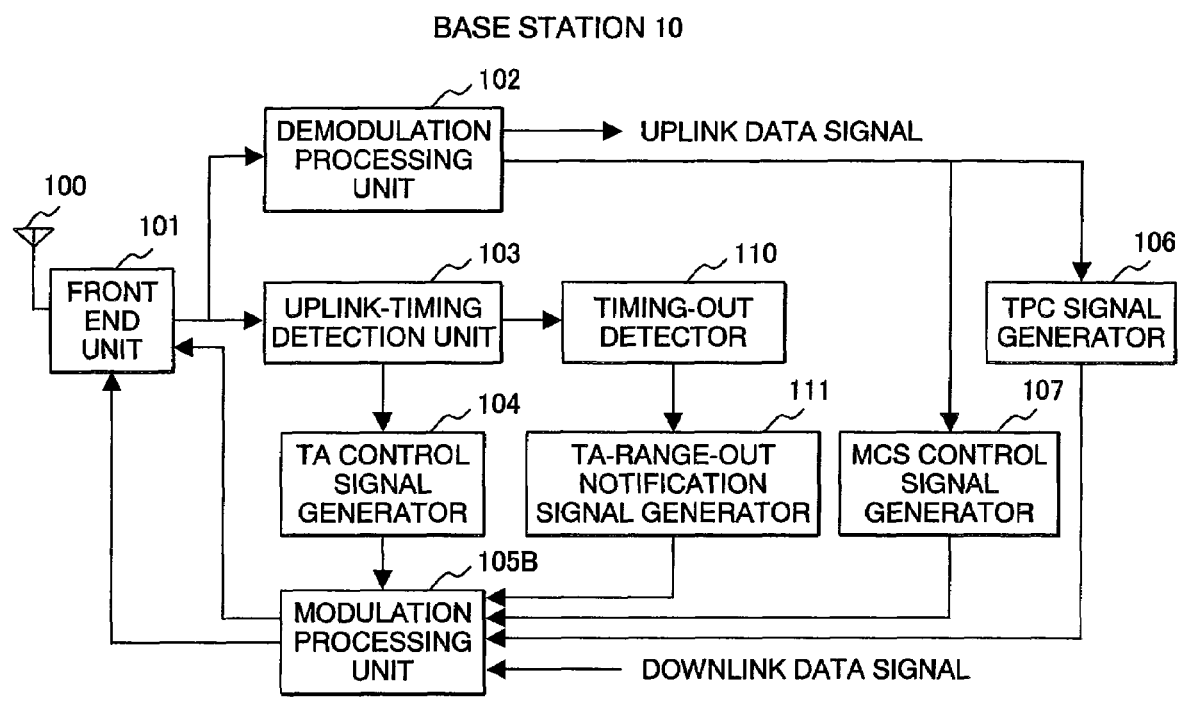
FIG. 9 is a diagram showing the configuration of a radio transmission/reception unit for the base station 10 applied to the second embodiment of the invention.

FIG. 9 shows the configuration of a radio transmission/reception unit for the base station 10 applied to the second embodiment of the invention.

In the second embodiment, the TA-range-out indication signal generated by the timing-out detector 110 is outputted to a TA-range-out notification signal generator 111. The TA-range-out notification signal generator 111 generates a TA-range-out notification signal according to the status of the TA-range-out indication signal, and outputs it to a modulation processing unit 105B.

The modulation processing unit 105B multiplexes the TA-range-out notification signal with the downlink data outputted from the control unit and control signals from the TA control signal generator 104, the TPC signal generator 106, the MCS control signal generator 107, and the uplink scheduler 108, and converts the multiplexed signals into a downlink baseband OFDM signal to output it to the front end unit 101.

Figure 10:
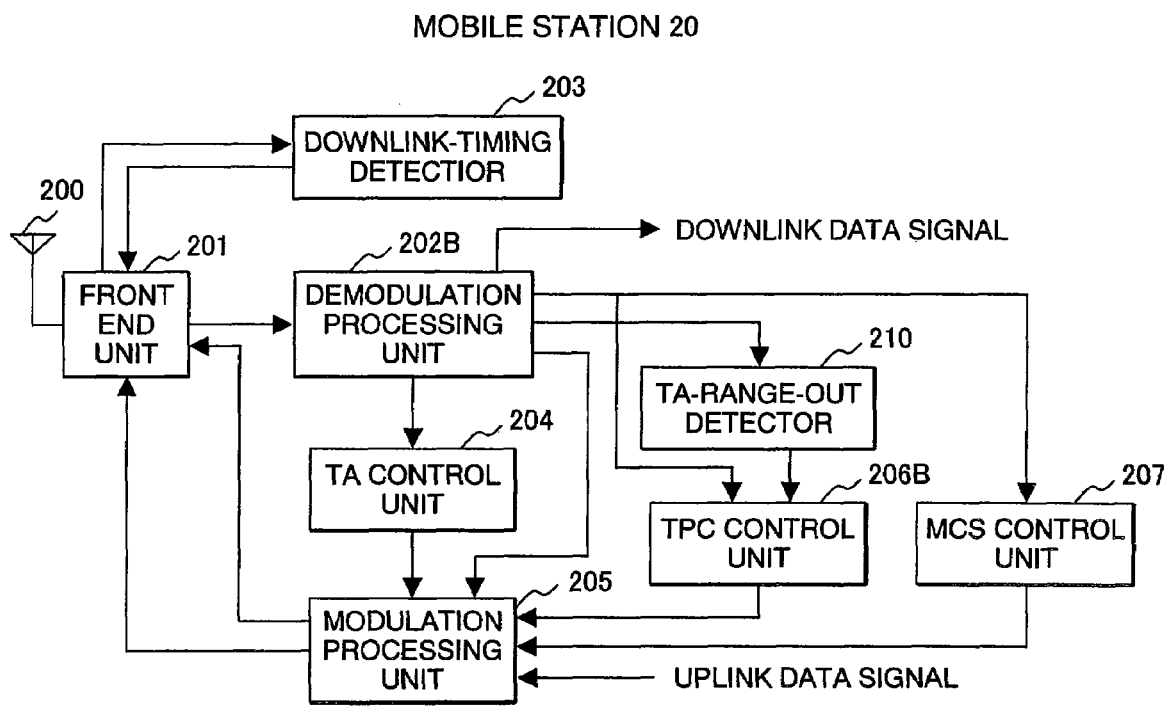
FIG. 10 is a diagram showing the configuration of a radio transmission/reception unit for the mobile station 20 applied to the second embodiment of the invention.

FIG. 10 shows the configuration of a radio transmission/reception unit for the mobile station 20 applied to the second embodiment.

In the mobile station 20 of the second embodiment, a demodulation processing unit 202B detects a TA-range-out notification signal from a baseband OFDM signal inputted from the front end unit 201, and outputs the TA-range-out notification signal to a TA-range-out detector 210. If the TA-range-out notification signal inputted from the demodulation processing unit 202B indicates a TA-range-out occurrence, the TA-range-out detector 210 turns on a TA-range-out indication signal to be outputted to a TPC control unit 206B. If the TA-range-out notification signal does not indicate a TA-range-out occurrence, the TA-range-out detector 210 turns off the TA-range-out indication signal.

Figure 11:
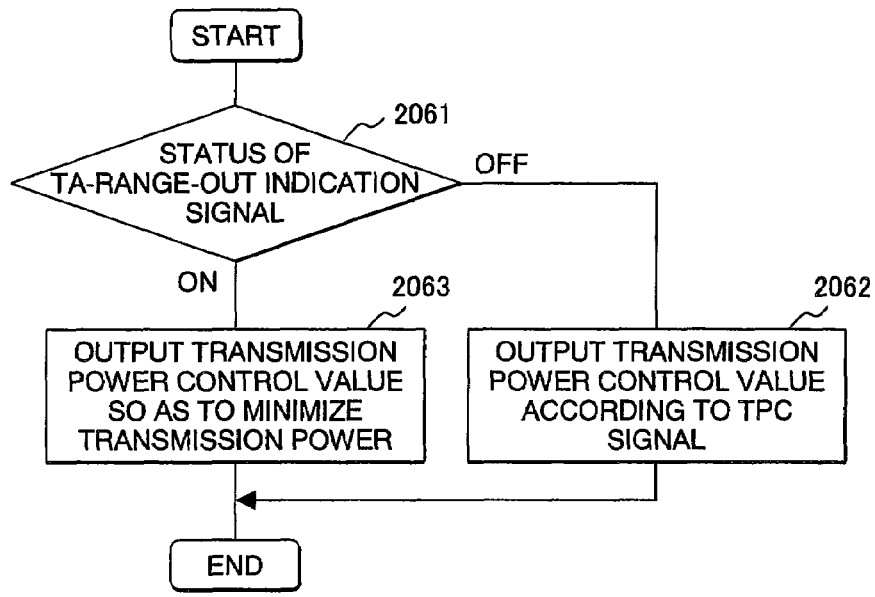
FIG. 11 is a flowchart showing the operation of a TPC control unit 206B provided in the mobile station 20 of the second embodiment.

As shown in FIG. 11, the TPC control unit 206B of the second embodiment determines the status of the TA-range-out indication signal (step 2061). If the TA-range-out indication signal is in the OFF state, the TPC control unit 206B outputs to the modulation processing unit 205 a transmission power control value corresponding to a TPC signal inputted from the demodulation processing unit 202B (2062). If the TA-range-out indication signal is in the ON state, the TPC control unit 206B generates a transmission power control value for minimizing the transmission power, and outputs it to the modulation processing unit 205 (2063). The modulation processing unit 205 controls the power amplifier of the front end unit 201 according to the transmission power control signal inputted from the TPC control unit 206B and outputs the uplink baseband OFDM data signal to the front end unit 201.

In the second embodiment, when the TA-range-out occurs in the uplink data from the mobile station, the interfering with communication of other mobile stations is avoided as illustrated in FIG. 3C, by notifying the TA-range-out occurrence from the base station 10 to the mobile station 20 with the TA-range-out notification signal different from the TPC signal, so that the TPC control unit 206B of the mobile station 20 can output a transmission power control value according to the TPC signal and the TA-range-out notification signal.

Third Embodiment

Figure 12:
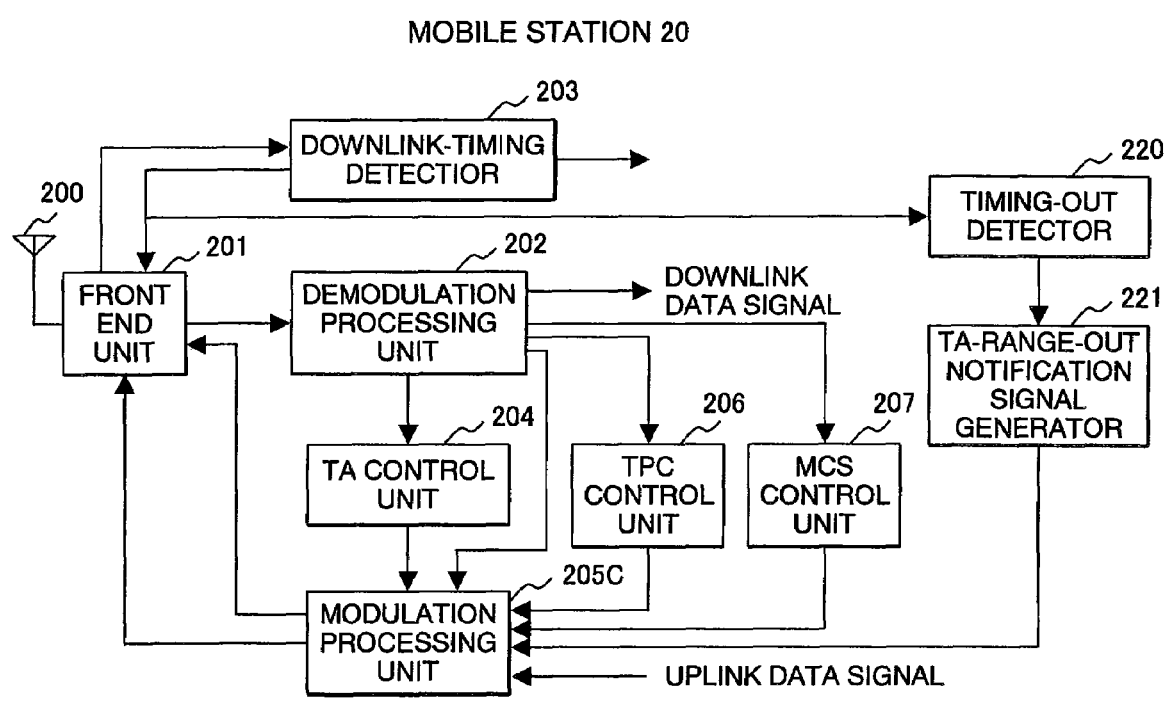
FIG. 12 is a diagram showing the configuration of a radio transmission/reception unit for the mobile station 20 applied to the third embodiment of the invention.

FIG. 12 shows the configuration of a radio transmission/reception unit for the mobile station 20 applied to the third embodiment of the invention.

In the third embodiment, the mobile station 20 is provided with the function of detecting TA-range-out. When the TA-range-out is detected, the mobile station 20 transmits a TA-range-out notification signal to the base station 10. Upon receiving the TA-range-out notification signal from the mobile station, the base station 10 generates a TPC signal for minimizing the transmission power and controls the transmission power of the mobile station.

As shown in FIG. 12, the mobile station 20 of the third embodiment is provided with a timing-out detector 220 to which a reception timing adjustment signal is inputted from the downlink-timing detector 203, and a TA-range-out notification signal generator 221 connected between the timing-out detector 220 and a modulation processing unit 205C.

Figure 13:
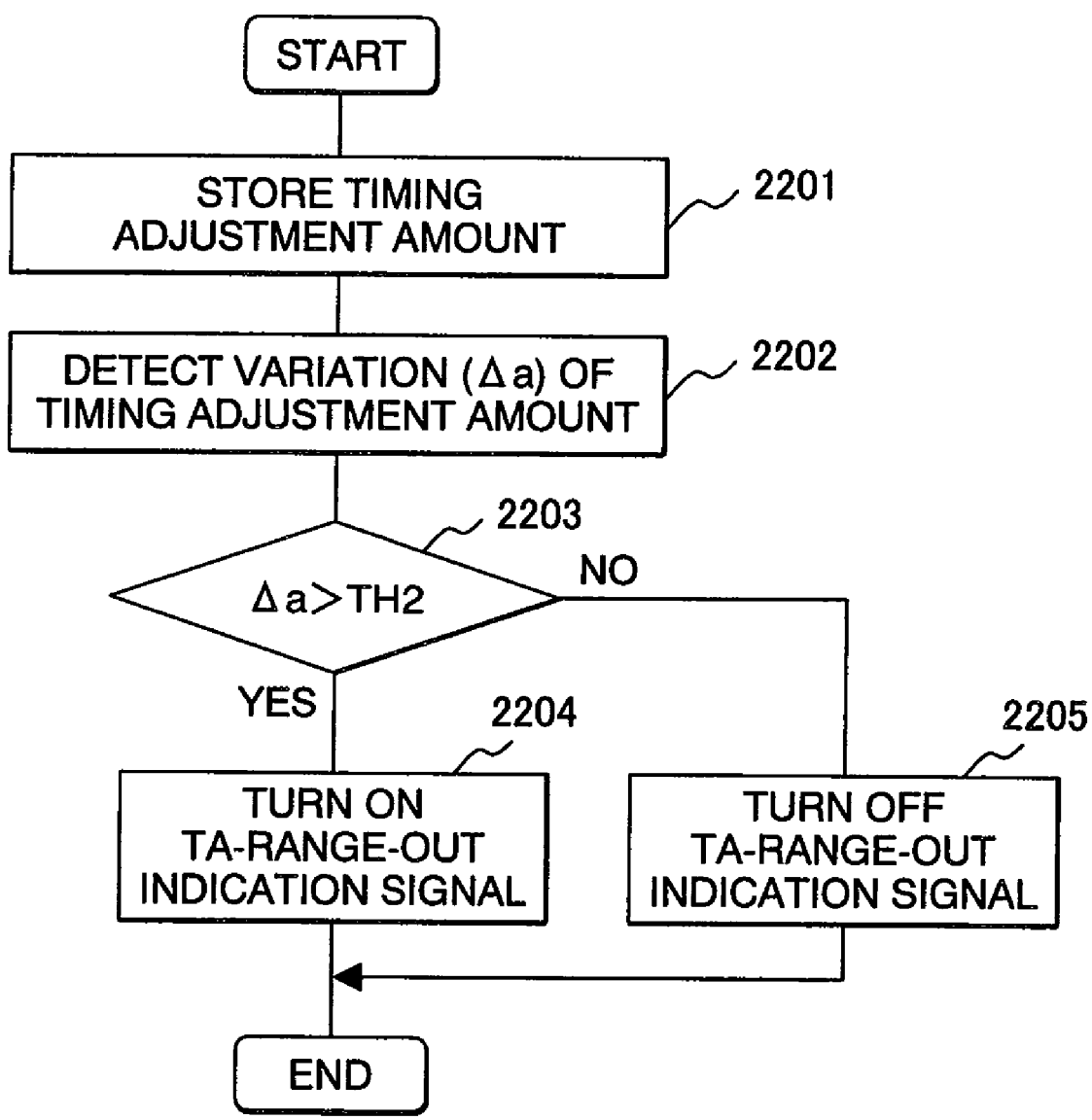
FIG. 13 is a flowchart showing the operation of the timing-out detector 220 included in the mobile station 20 of the third embodiment.

The timing-out detector 220 includes a buffer memory for storing a timing adjustment amount. As shown in FIG. 13, when a reception timing adjustment signal is inputted from the downlink-timing detector 203, the timing-out detector 220 stores a new timing adjustment amount indicated by the reception timing adjustment signal into the buffer memory (step 2201), detects the variation (difference) $\Delta a$ between the immediately preceding timing adjustment amount read out from the buffer memory and the new timing adjustment amount (2202), and compares the variation $\Delta a$ with a preset threshold TH2 (2203). If Δa>TH2, the timing-out detector 220 turns on a TA-range-out indication signal (2204). If Δa≦TH2, the timing-out detector 220 turns off the TA-range-out indication signal (2205).

When the TA-range-out indication signal is in the ON state, the TA-range-out notification signal generator 221 generates a TA-range-out notification signal and outputs it to the modulation processing unit 205C. However, the TA-range-out notification signal generator 221 may generate TA-range-out notification signals at predetermined intervals, and output to the modulation processing unit 205C an ON-state TA-range-out notification signal when the TA-range-out occurs and an OFF-state TA-range-out notification signal during when the TA-range-out is not detected. The TA-range-out notification signal is multiplexed with the uplink data signal by the modulation processing unit 205C, and outputted as an uplink baseband OFDMA signal to the front end unit 201.

Figure 14:
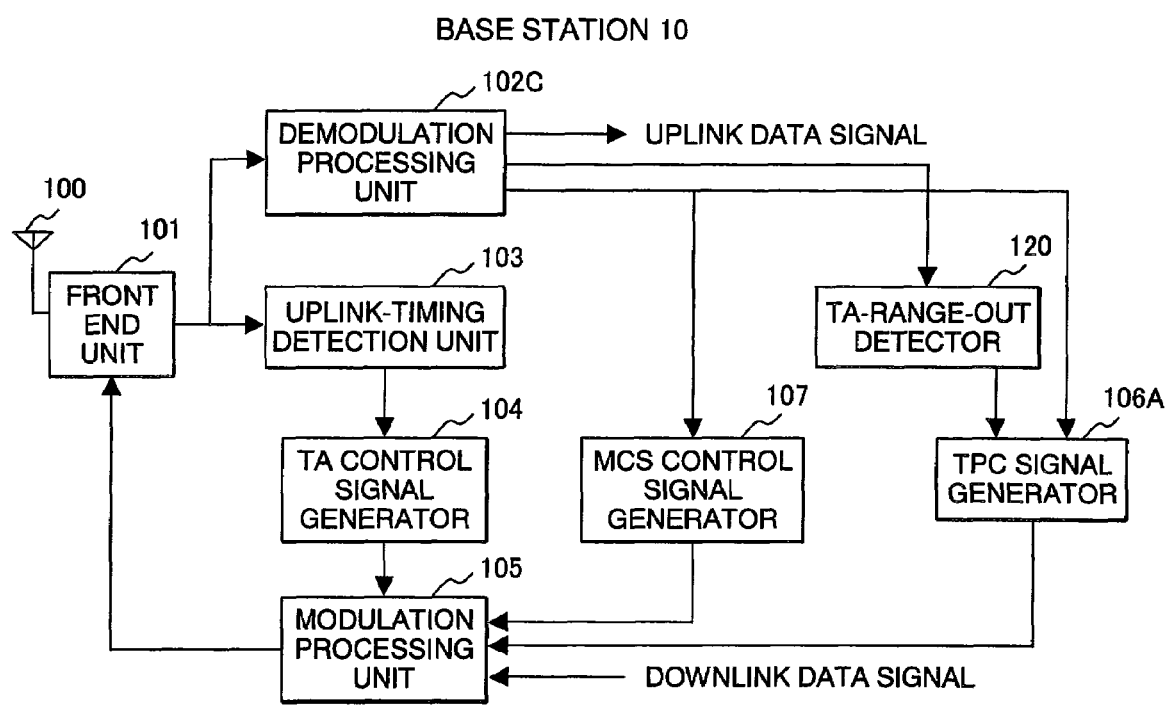
FIG. 14 is a diagram showing the configuration of a radio transmission/reception unit for the base station 10 applied to the third embodiment of the invention.

FIG. 14 shows the configuration of a radio transmission/reception unit for the base station 10 applied to the third embodiment.

In the base station 10 of the third embodiment, a demodulation processing unit 102C outputs a TA-range-out notification signal extracted from the uplink baseband OFDMA signal to a TA-range-out detector 120. Upon detecting the occurrence of the TA-range-out in the mobile station based on the status of the TA-range-out notification signal, the TA-range-out detector 120 turns on a TA-range-out indication signal to be outputted to the TPC signal generator 106A. In the case of no occurrence of the TA-range-out in the mobile station, the TA-range-out indication signal is maintained in the off state.

The TPC signal generator 106A generates a TPC signal by performing the procedure illustrated in FIG. 7 in accordance with the reception signal quality inputted from the demodulation processing unit 102C and the status of the TA-range-out indication signal inputted from the TA-range-out detector 120, and outputs a TPC signal to the modulation processing unit 105.

Fourth Embodiment

Figure 15:
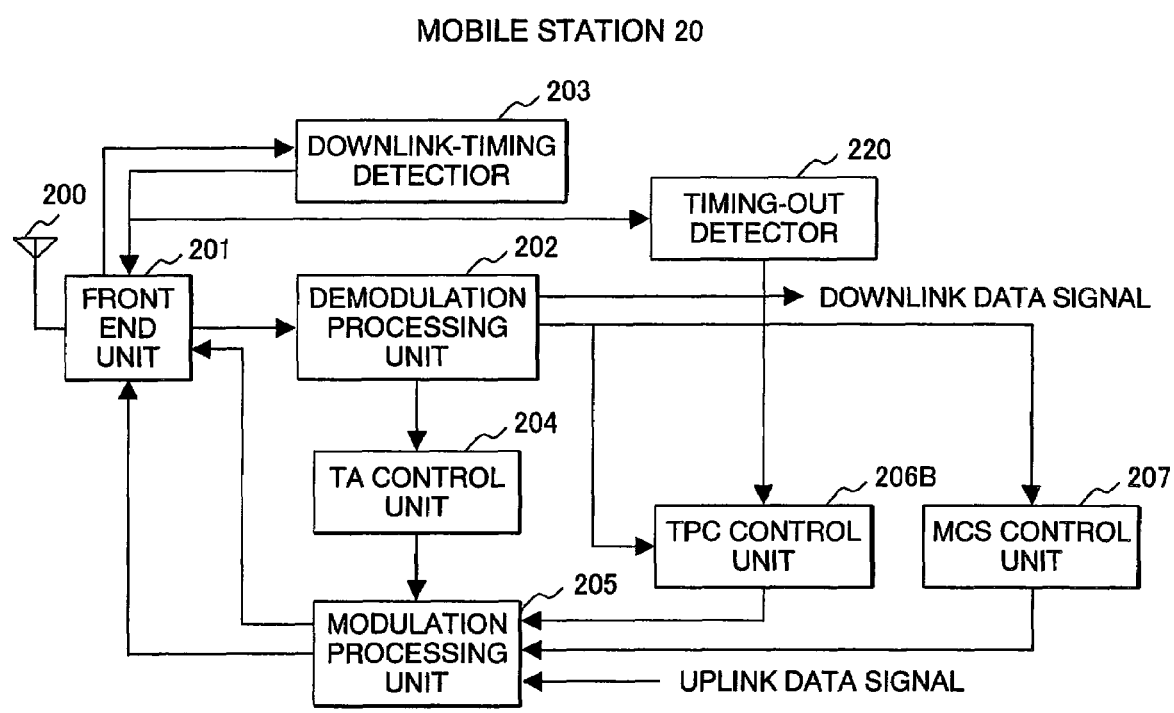
FIG. 15 is a diagram showing the configuration of a radio transmission/reception unit for the mobile station 20 applied to the fourth embodiment of the invention.

FIG. 15 shows the configuration of a radio transmission/reception unit for the mobile station 20 applied to the fourth embodiment of the invention.

In the mobile station 20 of the fourth embodiment, the TA-range-out indication signal outputted from the timing-out detector 220 of the third embodiment is inputted to the TPC control unit 206B.

The TPC control unit 206B decides a transmission power control value by performing the procedure shown in FIG. 11, in accordance with the status of the TA-range-out indication signal inputted from the timing-out detector 220 and the TPC signal inputted from the demodulation processing unit 202, and outputs a transmission power control value to the modulation processing unit 205.

In the fourth embodiment, when the mobile station 20 detects the TA-range-out state, affection to other mobile stations is avoided by autonomously reducing the transmission power of the mobile station 20 to the minimum power.

Fifth Embodiment

Figure 16:
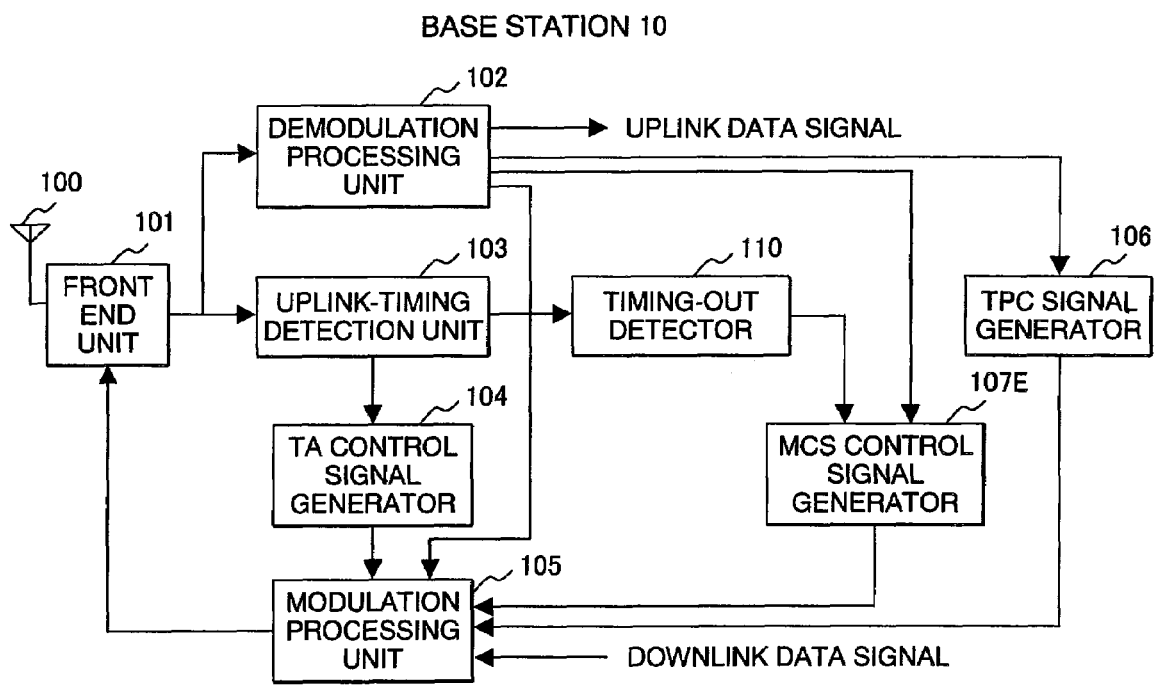
FIG. 16 shows the configuration of a radio transmission/reception unit for the base station 10 applied to the fifth embodiment of the invention.

FIG. 16 shows the configuration of a radio transmission/reception unit for the base station 10 applied to the fifth embodiment of the invention.

In the fifth embodiment, the TA-range-out indication signal outputted from the timing-out detector 110 of the first embodiment shown in FIG. 5 is inputted to an MCS control signal generator 107E.

Figure 17:
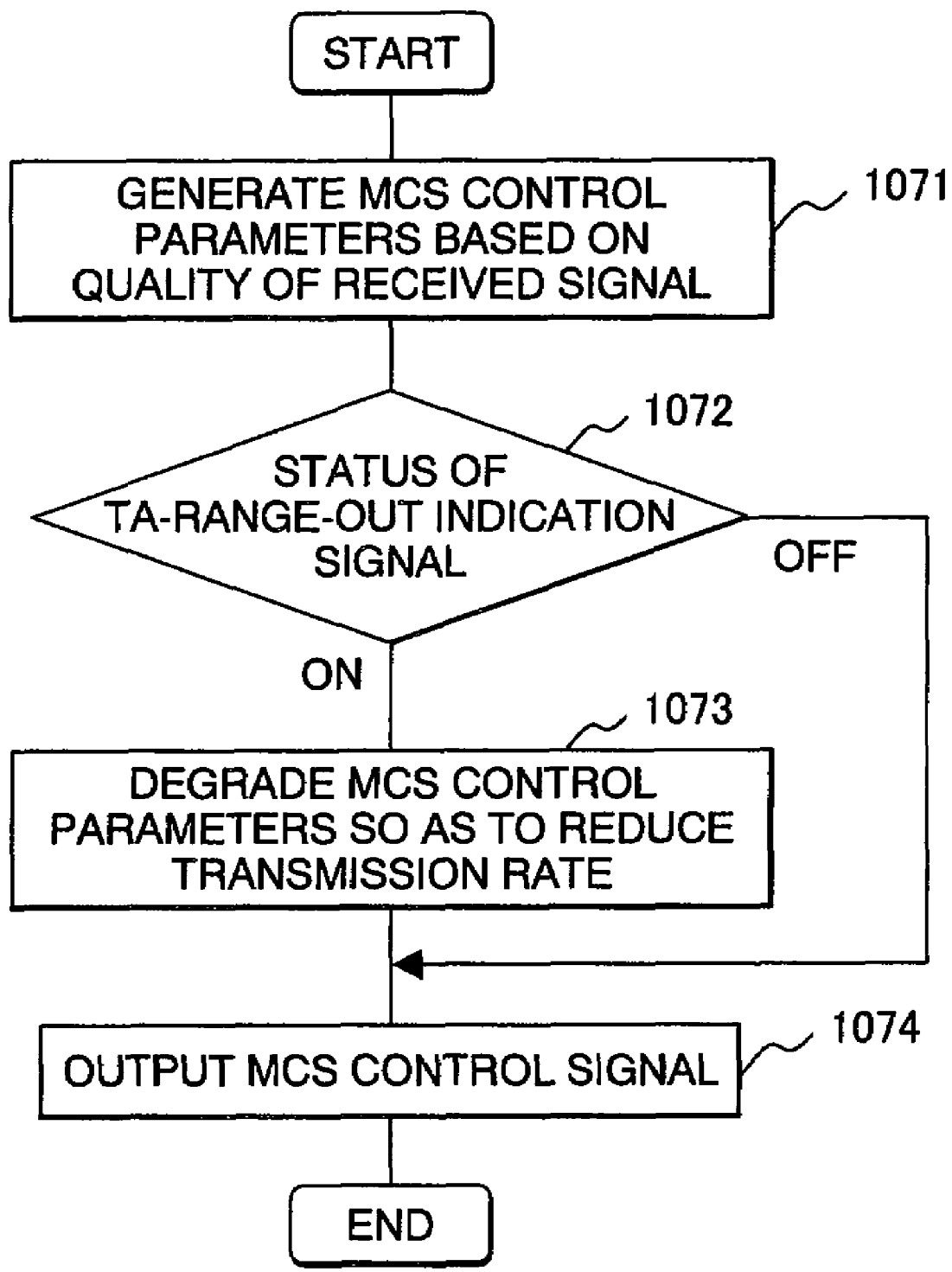
FIG. 17 is a flowchart showing the operation of an MCS control signal generator 107E provided in the base station of the fifth embodiment.

In the fifth embodiment, as shown in FIG. 17, the MCS control signal generator 107E generates MCS control parameters based on the reception signal quality inputted from the demodulation processing unit 102 (step 1071), and determines the status of the TA-range-out indication signal (1072).

If the TA-range-out indication signal is in the OFF state, the MCS control signal generator 107E outputs an MCS control signal including the MCS control parameters generated in step 1071 to the modulation processing unit 105 (1074). If the TA-range-out indication signal is in the ON state, the MCS control signal generator 107E degrades the MCS control parameters generated in step 1071, for example, so as to reduce the transmission rate (1073), and outputs an MCS control signal including the degraded MCS control parameters to the modulation processing unit 105 (1074).

According to the fifth embodiment, by reducing the MCS grade of the station in the TA-range-out mobile state, e.g., the transmission rate, it becomes possible to prevent the communication of the mobile station from being interrupted.

Sixth Embodiment

Figure 18:
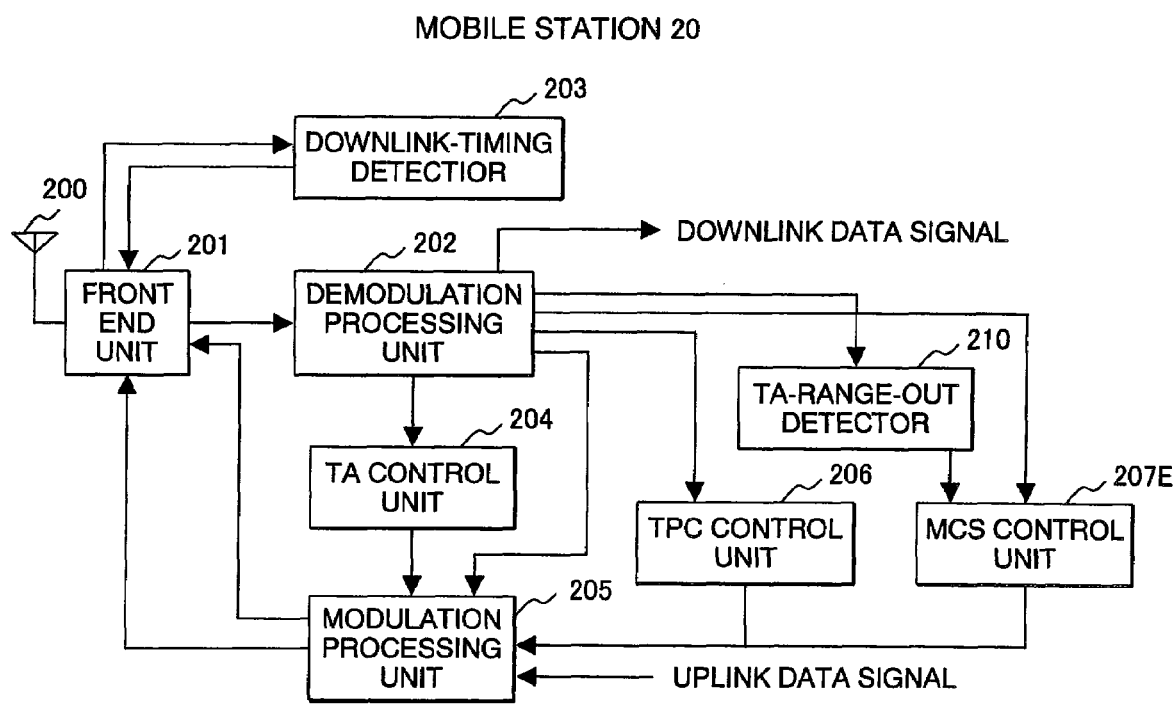
FIG. 18 is a diagram showing the configuration of a radio transmission/reception unit for the mobile station 20 applied to the sixth embodiment of the invention.

FIG. 18 shows the configuration of a radio transmission/reception unit for the mobile station 20 applied to the sixth embodiment of the invention.

In the mobile station 20 of the sixth embodiment, the TA-range-out indication signal outputted from the TA-range-out detector 210 according to the second embodiment illustrated in FIG. 10 is inputted to an MCS control unit 207E.

Figure 19:
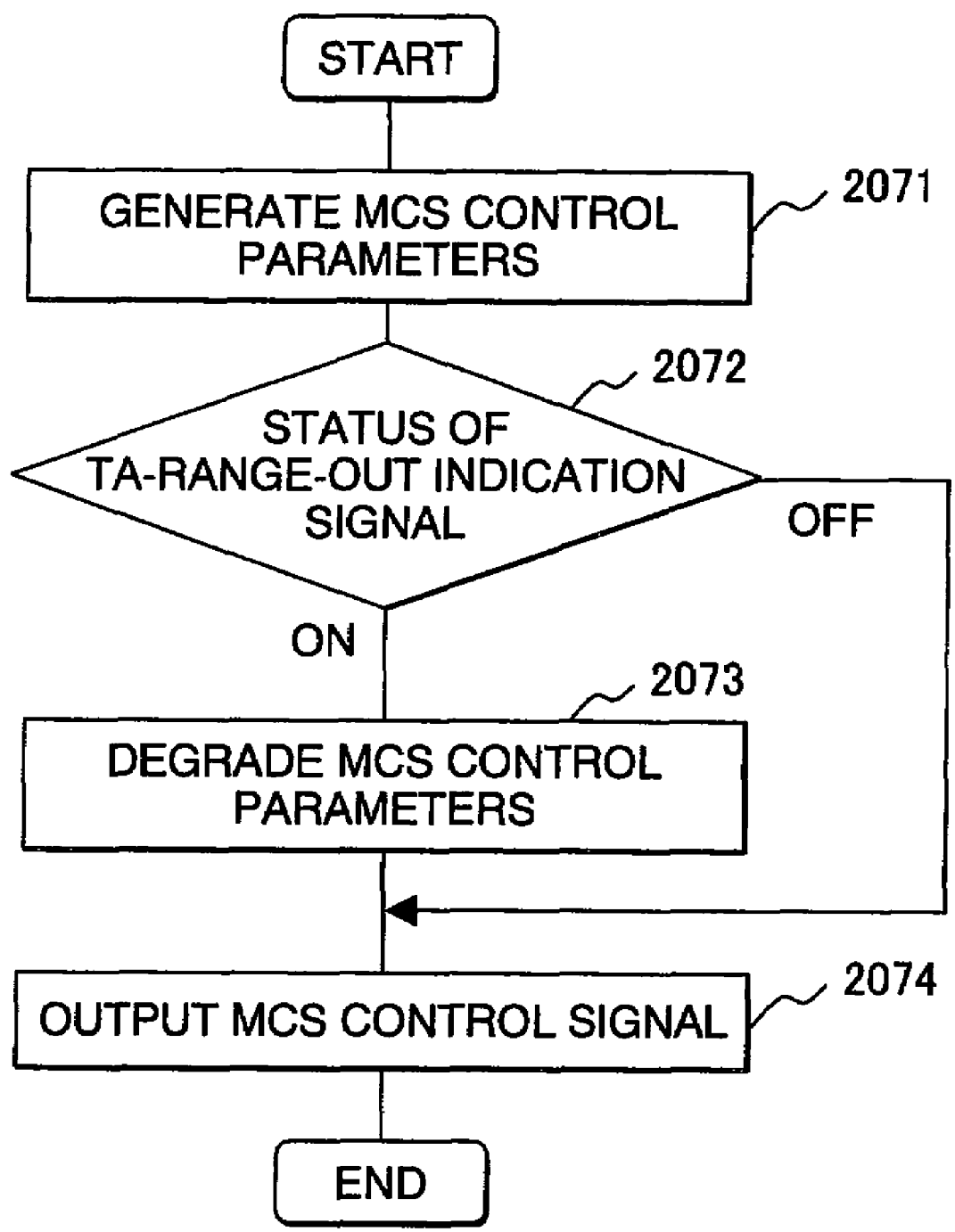
FIG. 19 is a flowchart showing the operation of an MCS control unit 207E provided in the mobile station 20 of the sixth embodiment.

As shown in FIG. 19, the MCS control unit 207E generates MCS control parameters according to an MCS control signal inputted from the demodulation processing unit 202 (step 2071), and determines the status of the TA-range-out indication signal (2072).

If the TA-range-out indication signal is in the OFF state, the MCS control unit 207E outputs an MCS control signal including the MCS control parameters generated in step 2071 to the modulation processing unit 205 (2074). If the TA-range-out indication signal is in the ON state, the MCS control unit 207E modifies the MCS control parameters generated in step 2071 in order to generate, e.g., MCS control parameters for reducing the transmission rate (2073), and outputs an MCS control signal including the degraded MCS control parameters to the modulation processing unit 105 (2074).

According to the sixth embodiment, even when the TA-range-out occurs, it is possible to guarantee the communication of the mobile station in the TA-range-out state by reducing its transmission rate.

Seventh Embodiment

Figure 20:
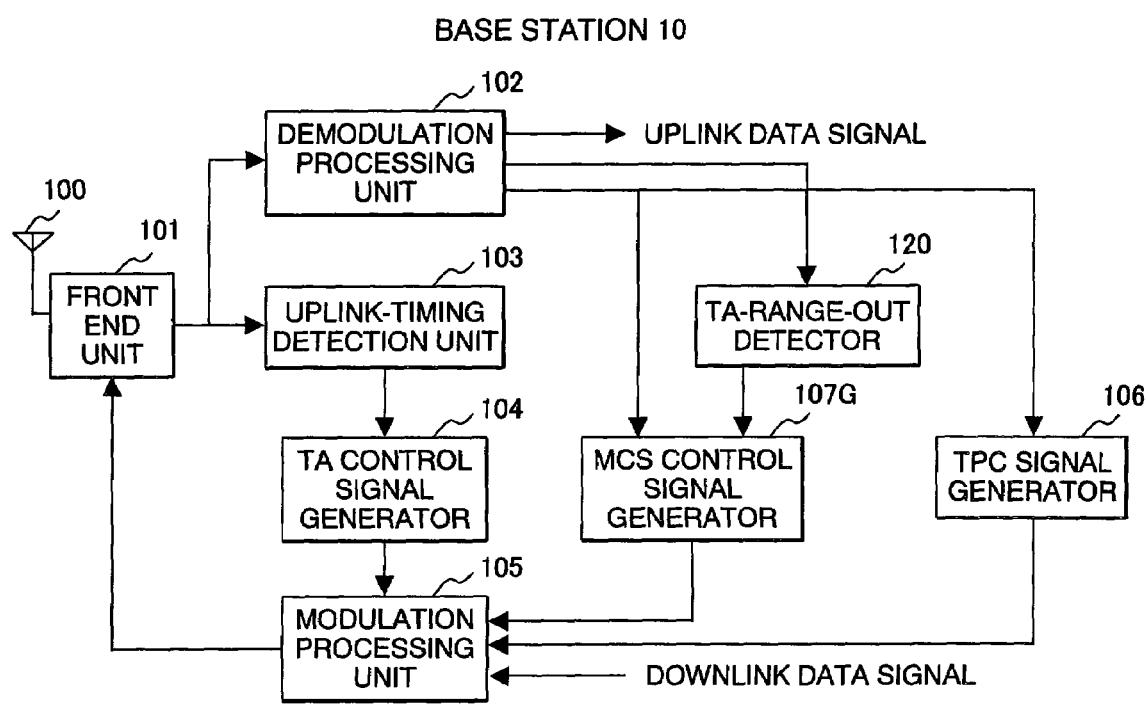
FIG. 20 is a diagram showing the configuration of a radio transmission/reception unit for the base station 10 applied to the seventh embodiment of the invention.

In the seventh embodiment, the mobile station with the function of generating the TA-range-out notification signal as in the case of the third embodiment illustrated in FIG. 12 is used. FIG. 20 shows the configuration of a radio transmission/reception unit for the base station 10 applied to the seventh embodiment of the invention.

In the base station 10 of the seventh embodiment, the TA-range-out indication signal outputted from the TA-range-out detector 120 according to the third embodiment illustrated in FIG. 14 is inputted to an MCS control signal generator 107G. According to the procedure shown in FIG. 17, when the TA-range-out indication signal is in the OFF state, the MCS control signal generator 107G outputs an MCS control signal generated based on the reception signal quality to the modulation processing unit 205. If the TA-range-out indication signal is in the ON state, the MCS control signal generator 107G generates a MCS control signal including degraded MCS parameters, and outputs the MCS control signal to the modulation processing unit 105. According to the seventh embodiment, the mobile station 20 can control the MCS of uplink signal in accordance with the MCS control signal received from the base station 10.

Eighth Embodiment

Figure 21:
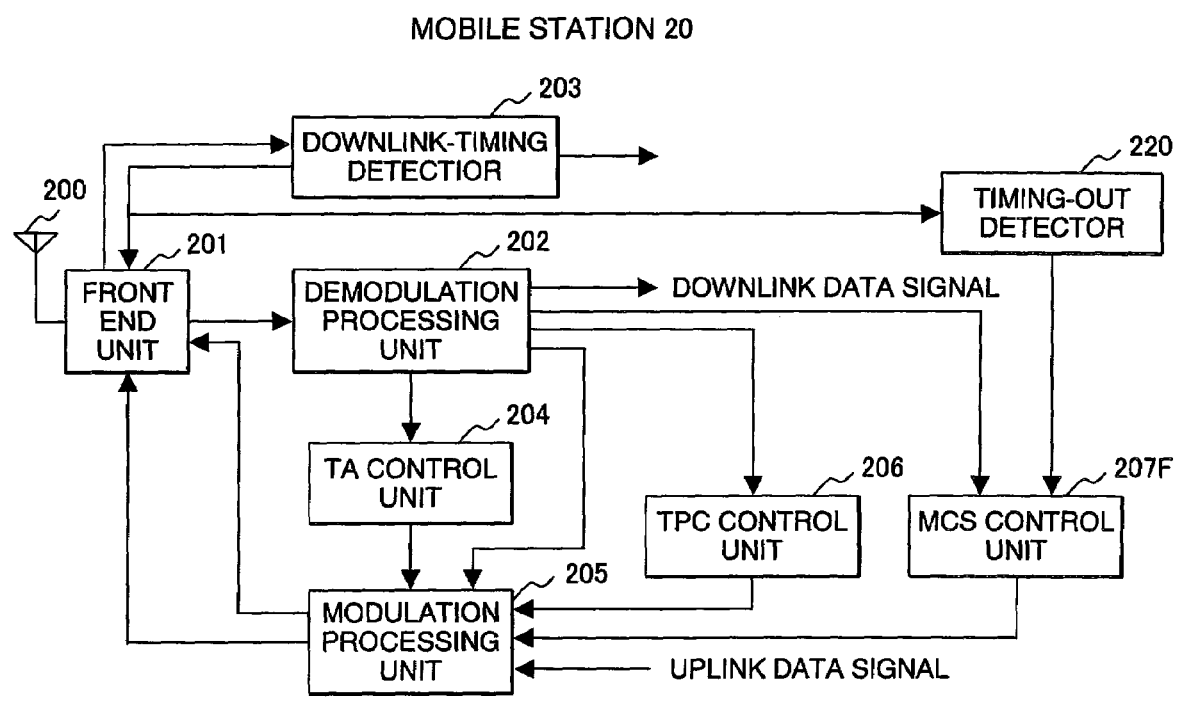
FIG. 21 is a diagram showing the configuration of a radio transmission/reception unit for the mobile station 20 applied to the eighth embodiment of the invention.

FIG. 21 shows the configuration of a radio transmission/reception unit for the mobile station 20 applied to the eighth embodiment of the invention.

In the mobile station 20 of the eighth embodiment, the TA-range-out indication signal outputted from the timing-out detector 220 according to the fourth embodiment illustrated in FIG. 15 is inputted to an MCS control unit 207F.

According to the procedure illustrated in FIG. 19, when the TA-range-out indication signal is in the OFF state, the MCS control unit 207F outputs an MCS control signal generated in accordance with the signal quality to the modulation processing unit 205. If the TA-range-out indication signal is in the ON state, the MCS control unit 207F generates a degraded MCS control signal for reducing the transmission rate, and outputs the degraded MCS control signal to the modulation processing unit 205.

According to the eighth embodiment, when the TA-range-out occurs, it possible to guarantee the TA-range-out mobile station to keep communication by reducing the transmission rate.

Ninth Embodiment

Figure 22:
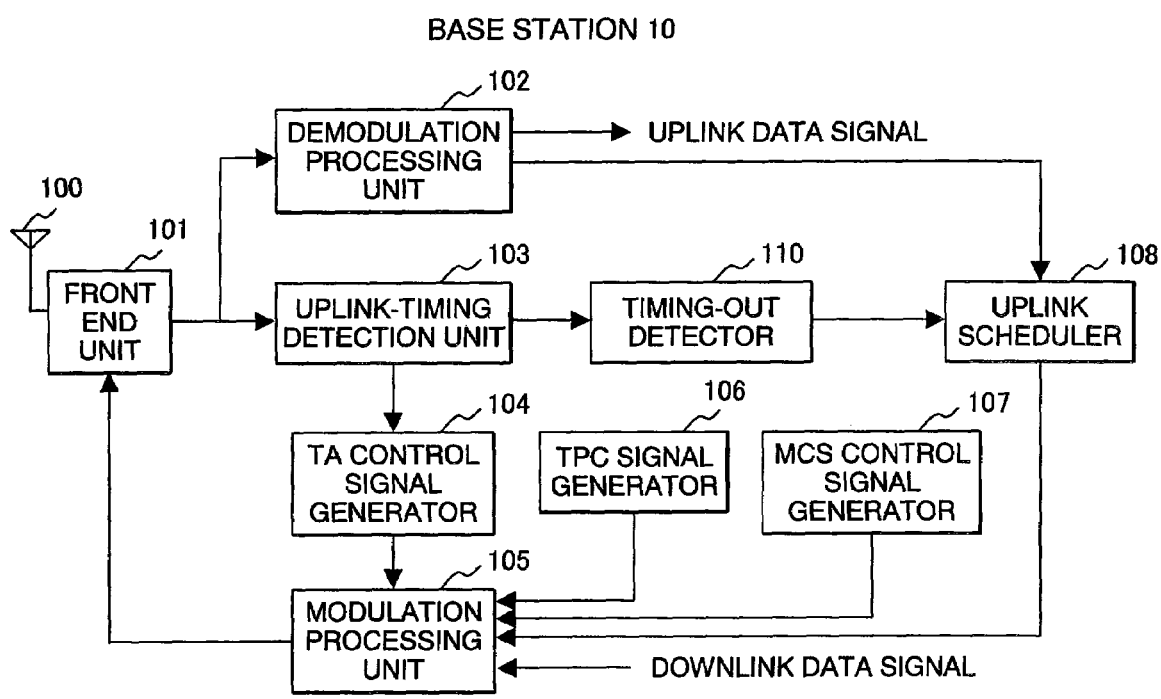
FIG. 22 is a diagram showing the configuration of a radio transmission/reception unit for the base station 10 applied to the ninth embodiment of the invention.

FIG. 22 shows the configuration of a radio transmission/reception unit for the base station 10 applied to the ninth embodiment of the invention.

In the base station 10 of the ninth embodiment, the TA-range-out indication signal outputted from the timing-out detector 110 according to the first embodiment illustrated in FIG. 5 is inputted to the uplink scheduler 108 so that the uplink scheduler 108 changes the channel to be used by the mobile station in the TA-range-out state as illustrated in FIG. 4B.

Figure 23:
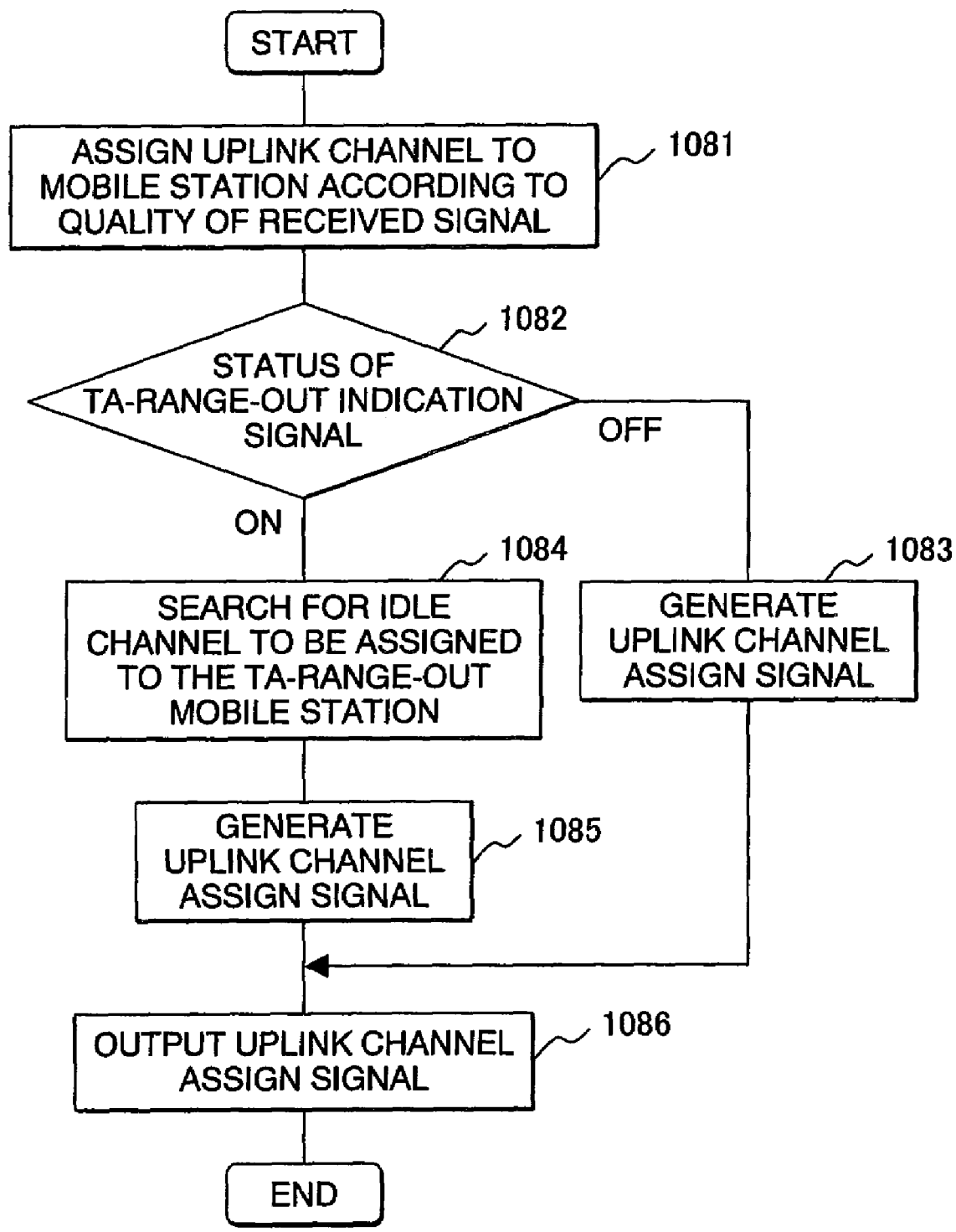
FIG. 23 is a flowchart showing the operation of an uplink scheduler 108 provided in the base station of the ninth embodiment.

The uplink scheduler 108 assigns a channel to each mobile station by referring to a scheduling table (not shown) which indicates an assigned channel for each mobile station, according to a procedure shown in FIG. 23. That is, the uplink scheduler 108 assigns an uplink channel to the mobile station in accordance with the reception signal quality inputted from the demodulation processing unit 102 by referring to the scheduling table (1081).

In this embodiment, the uplink scheduler 108 determines the status of the TA-range-out indication signal outputted from the timing-out detector 110 (1082). If the TA-range-out indication signal is in the OFF state, the uplink scheduler 108 generates an uplink channel assignment signal (1083) in accordance with the result of channel assignment performed in step 1081, and outputs an uplink channel assignment signal to the modulation processing unit 105 (1086).

When the TA-range-out indication signal is in the ON state, the uplink scheduler 108 searches the scheduling table for a new channel to be assigned to the TA-range-out mobile station from among channels whose adjacent segments are idle (1084). Then, the uplink scheduler 108 generates an uplink channel assignment signal (1085), and outputs the uplink channel assignment signal to the modulation processing unit 105 (1086). In order to facilitate the channel assignment to the mobile station in the TA-range-out state, dedicated channel resources to be searched when the TA-range-out occurs may be prepared in the scheduling table beforehand.

Tenth Embodiment

Figure 24:
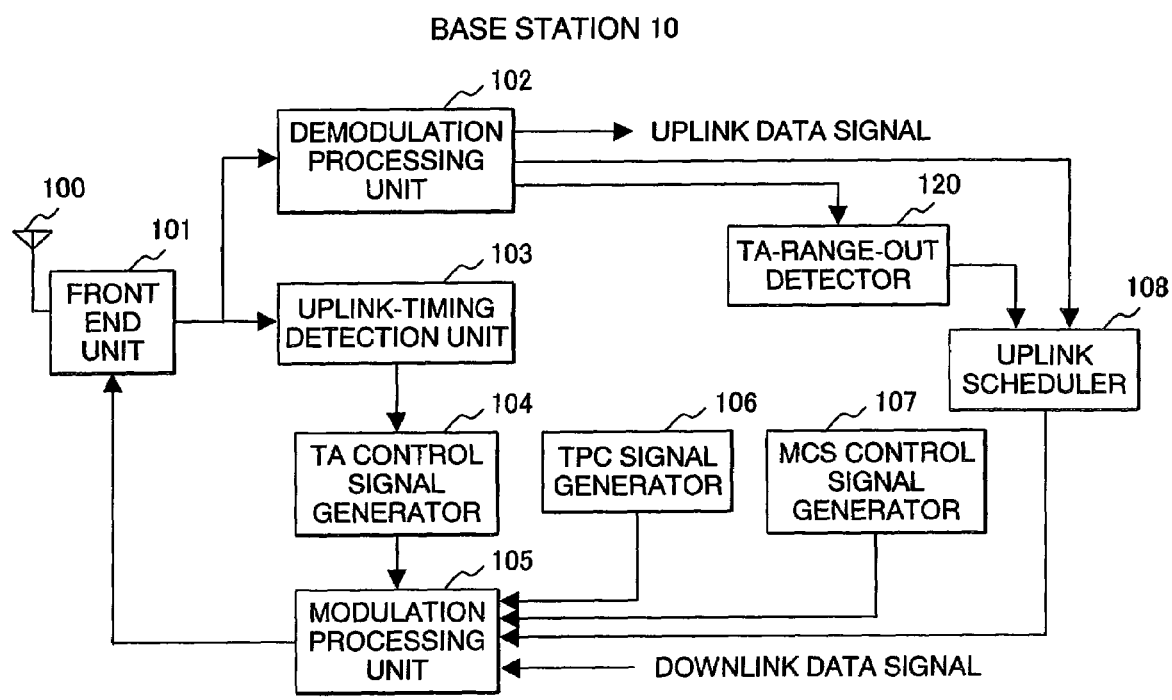
FIG. 24 is a diagram showing the configuration of a radio transmission/reception unit for the base station 10 applied to the tenth embodiment of the invention.

FIG. 24 shows the configuration of a radio transmission/reception unit for the base station 10 applied to the tenth embodiment of the invention.

In the base station 10 of the tenth embodiment, the TA-range-out indication signal outputted from the TA-range-out detector 120 shown in FIG. 14 is inputted to the uplink scheduler 108, so that the uplink scheduler 108 changes the channel to be used by the mobile station in the TA-range-out state as illustrated in FIG. 4B, according to the procedure illustrated in FIG. 23. In the tenth embodiment, the mobile station of the second embodiment shown in FIG. 10 is applied.

In the embodiments described above, either the mobile station or the base station has the TA-range-out detection function, so that the transmission condition of the uplink signal at the mobile station in the TA-range-out state is changed by the mobile station autonomously or by the mobile station and the base station cooperatively. However, a plurality of embodiments of the invention may be combined, for example, so as to simultaneously achieve the examples of FIG. 3C and FIG. 4B. Further, the combination of the mobile station 20 and the base station 10 shown in the embodiments may be changed as necessary.

What is claimed is:

1. A base station constituting a cellular radio communication system, the base station comprising:
   an antenna for communicating radio frequency (RF) signals with a mobile station;
   a front end unit for converting the RF signal received by the antenna into an uplink baseband signal, and converting a downlink baseband signal to be transmitted to the mobile station into an RF signal to output the RF signal to the antenna;
   a demodulation processing unit for demodulating the uplink baseband signal outputted from the front end unit;
   a modulation processing unit for multiplexing a control signal and a downlink data signal to be transmitted to the mobile station and converting into a downlink baseband signal to output the downlink baseband signal to the front end unit;
   an uplink-timing detector for detecting a reception timing gap of an uplink signal transmitted by the mobile station, from the uplink baseband signal outputted from the front end unit;
   a time alignment (TA) control signal generator for generating a TA control signal based on the uplink signal reception timing gap detected by the uplink-timing detector and outputting the TA control signal to the modulation processing unit;
   a timing-out detector for generating a TA-range-out signal indicating whether the mobile station is in an out of normal TA control range state or not, according to a result of a comparison between the uplink signal reception timing gap outputted from the uplink-timing detector and a predetermined threshold; and
   a transmission condition change signal generator which generates a transmission condition change signal for changing a transmission condition of the uplink signal in the mobile station based on the TA-range-out signal outputted from the timing-out detector and outputs the transmission condition change signal as the control signal to the modulation processing unit, wherein the downlink baseband signal outputted from the modulation processing unit to the front end unit includes the transmission condition change signal and the TA control signal.

2. The base station according to claim 1, wherein
the demodulation processing unit outputs a demodulated uplink data signal and signal quality information indicating reception signal quality, the transmission condition change signal generator is composed of a transmission power control (TPC) signal generator which generates, as the transmission condition change signal, a TPC signal for controlling a transmission power of the mobile station according to the signal quality information outputted from the demodulation processing unit, and the TPC signal generator generates, when the TA-range-out signal outputted from the timing-out detector indicates the out of normal TA control range state, a TPC signal instructing the mobile station in the out of normal TA control range state to reduce the transmission power to a predetermined minimum power.

3. The base station according to claim 1, wherein
the demodulation processing unit outputs a demodulated uplink data signal and signal quality information indicating reception signal quality, the transmission condition change signal generator is composed of a modulation coding scheme (MCS) control signal generator which generates an MCS control signal including control parameters for specifying at least a modulation scheme and a coding rate of the mobile station, according to the signal quality information outputted from the demodulation processing unit, and the MCS control signal generator degrades the control parameters in the MCS control signal to be transmitted to the mobile station when the TA-range-out signal indicates the out of normal TA control range state, and outputs the degraded MCS control signal to the modulation processing unit.

4. The base station according to claim 1, wherein
the demodulation processing unit outputs a demodulated uplink data signal and signal quality information indicating reception signal quality, the transmission condition change signal generator is composed of an uplink scheduler which assigns an uplink channel to the mobile station according to the signal quality information outputted from the demodulation processing unit and outputs a control signal indicating the assigned channel to the modulation processing unit, and the uplink scheduler changes the channel to be assigned to mobile station when the TA-range-out signal indicates the out of normal TA control range state.

5. The base station according to claim 1,
wherein the transmission condition change signal generator outputs a TA-range-out notification signal to be received by the mobile station as the transmission condition change signal.

6. A base station constituting a cellular radio communication system, the base station comprising:
an antenna for communicating RF signals with a mobile station;

a front end unit for converting an RF signal received from the antenna into an uplink baseband signal, converting a downlink baseband signal to be transmitted to the mobile station into an RF signal and outputting the RF signal to the antenna;

a demodulation processing unit for demodulating the uplink baseband signal outputted from the front end unit, and outputting a demodulated uplink data signal, signal quality information indicating reception signal quality, and a control signal transmitted from the mobile station;

a modulation processing unit for multiplexing a control signal and a downlink data signal to be transmitted to the mobile station, and converting into a downlink baseband signal to output the downlink baseband signal to the front end unit; and a transmission condition change signal generator which generates the control signal for changing a transmission condition of an uplink signal in the mobile station according to the signal quality information outputted from the demodulation processing unit and outputs the control signal to the modulation processing unit, wherein the transmission condition change signal generator generates, when a TA-range-out signal indicating that a downlink signal reception timing gap exceeds a predetermined threshold at the mobile station is outputted as the control signal from the demodulation processing unit, the control signal for degrading the transmission condition of the mobile station.

7. The base station according to claim 6,
wherein the transmission condition change signal generator is composed of a transmission power control (TPC) signal generator which generates, as the control signal, a TPC signal for controlling a transmission power of the mobile station in accordance with the signal quality information outputted from the demodulation processing unit and outputting the TPC signal to the modulation processing unit, and the TPC signal generator generates when the TA-range-out signal is received from the demodulation processing unit, a TPC signal for reducing a transmission power of the mobile station to a predetermined minimum power.

8. The base station according to claim 6,
wherein the transmission condition change signal generator is composed of an modulation coding scheme (MCS) control signal generator which generates an MCS control signal including control parameters for specifying at least a modulation scheme and a coding rate of the mobile station, in accordance with the signal quality information outputted from the demodulation processing unit and outputs the MCS control signal to the modulation processing unit, and the MCS control signal generator degrades the control parameters of the MCS control signal to be transmitted to the mobile station when the TA-range-out signal is received from the demodulation processing unit, and outputs the degraded MCS control signal to the modulation processing unit.

9. A base station constituting a cellular radio communication system, the base station comprising:
an antenna for communicating RF signals with a mobile station;

a front end unit for converting the RF signal received by the antenna into an uplink baseband signal, and converting a downlink baseband signal to be transmitted to the mobile station into an RF signal to output the RF signal to the antenna;

a demodulation processing unit for demodulating the uplink baseband signal outputted from the front end unit, and outputting a demodulated uplink data signal, signal quality information indicating reception signal quality, and a control signal transmitted from the mobile station;

a modulation processing unit for multiplexing a control signal and a downlink data signal to be transmitted to the mobile station and converting into a downlink baseband signal to output the downlink baseband signal to the front end unit; and an uplink scheduler for assigning an uplink channel to the mobile station in accordance with the signal quality information outputted from the demodulation processing unit and outputting a control signal indicating the assigned channel to the modulation processing unit, wherein the uplink scheduler changes the channel to be assigned to the mobile station when a TA-range-out signal indicating that a downlink signal reception timing gap exceeds a predetermined threshold at the mobile station is outputted as the control signal from the demodulation processing unit.

10. A mobile station which communicates with a base station constituting a cellular radio communication system, the mobile station comprising:

an antenna for communicating RF signals with the base station;

a front end unit for converting the RF signal received by the antenna into an downlink baseband signal, and converting an uplink baseband signal to be transmitted to the base station into an RF signal to output the RF signal to the antenna;

a demodulation processing unit for demodulating the downlink baseband signal outputted from the front end unit, and outputting a demodulated downlink data signal and plural kinds of control signals transmitted from the base station;

a modulation processing unit for multiplexing a control signal and an uplink data signal to be transmitted to the base station, and converting into an uplink baseband signal to output the uplink baseband signal to the front end unit;

a transmission condition control unit for controlling a transmission condition of an uplink signal in accordance with a specific control signal outputted from the demodulation processing unit; and a TA-range-out detector for outputting a TA-range-out indication signal indicating that the uplink signal of the mobile station is in a state of out of normal time alignment (TA) control range at the base station, based on a TA-range-out notification signal outputted from the demodulation processing unit, wherein the transmission condition control unit degrades, in response to the TA-range-out indication signal, the transmission condition having been determined in accordance with the specific control signal.

11. The mobile station according to claim 10, wherein the transmission condition control unit is composed of a transmission power control (TPC) unit for controlling a transmission power of the uplink signal to be transmitted from the front end unit according to a TPC signal outputted as one of the control signals from the demodulation processing unit, and the transmission power control unit reduces the transmission power of the uplink signal to a predetermined minimum power in response to the TA-range-out indication signal.

12. The mobile station according to claim 10, wherein the transmission condition control unit is composed of a modulation coding scheme (MCS) control unit for determining an operation mode of the modulation processing unit in accordance with an MCS control signal outputted as one of the control signals from the demodulation processing unit, and the MCS control unit switches the operation mode of the modulation processing unit to a predetermined degraded operation mode in response to the TA-range-out indication signal.

13. A mobile station which communicates with a base station constituting a cellular radio communication system, the mobile station comprising:

an antenna for communicating RF signals with the base station;

a front end unit for converting the RF signal received by the antenna into an downlink baseband signal, and converting an uplink baseband signal to be transmitted to the base station into an RF signal to output the RF signal to the antenna;

a demodulation processing unit for demodulating the downlink baseband signal outputted from the front end unit, and outputting a demodulated downlink data signal and plural kinds of control signals transmitted from the base station;

a modulation processing unit for multiplexing control signals and an uplink data signal to be transmitted to the base station and converting into an uplink baseband signal to output the uplink baseband signal to the front end unit;

a downlink-timing detector for generating at predetermined intervals, a reception timing adjustment signal indicating a reception timing adjustment amount for synchronizing downlink signal reception timing with reference timing of the base station, based on a reception signal of a synchronization channel outputted from the front end unit;

a timing-out detector for generating a TA-range-out indication signal when the reception timing adjustment amount indicated by the reception timing adjustment signal exceeds a predetermined threshold of time alignment (TA) control; and a TA-range-out notification signal generator which generates a TA-range-out notification signal according to the TA-range-out indication signal outputted from the timing-out detector and outputs the TA-range-out notification signal to the modulation processing unit, wherein the modulation processing unit outputs the uplink baseband signal including the TA-range-out notification signal to the front end unit.

14. A mobile station which communicates with a base station constituting a cellular radio communication system, the mobile station comprising:

an antenna for communicating RF signals with the base station;

a front end unit for converting the RF signal received by the antenna into an downlink baseband signal, and converting an uplink baseband signal to be transmitted to the base station into an RF signal to output the RF signal to the antenna;

a demodulation processing unit for demodulating the downlink baseband signal outputted from the front end unit, and outputting a demodulated downlink data signal and plural kinds of control signals transmitted from the base station;

a modulation processing unit for multiplexing control signals and an uplink data signal to be transmitted to the base station and converting into an uplink baseband signal to output the uplink baseband signal to the front end unit;

a transmission condition control unit for controlling a transmission condition of an uplink signal in accordance with a specific control signal outputted from the demodulation processing unit;

a downlink-timing detector for generating at predetermined intervals, a reception timing adjustment signal indicating a reception timing adjustment amount for synchronizing downlink signal reception timing with reference timing of the base station, based on a reception signal of a synchronization channel outputted from the front end unit; and a timing-out detector for generating a TA-range-out indication signal when the reception timing adjustment amount indicated by the reception timing adjustment signal exceeds a predetermined threshold of time alignment (TA) control, wherein the transmission condition control unit degrades, in response to the TA-range-out indication signal, the transmission condition determined in accordance with the specific control signal.

15. The mobile station according to claim 14, wherein the transmission condition control unit is composed of a transmission power control (TPC) unit for controlling a transmission power of the uplink signal to be transmitted from the front end unit, in accordance with a TPC signal outputted from the demodulation processing unit, and the TPC unit reduces the transmission power of the uplink signal to a predetermined minimum power in response to the TA-range-out indication signal.

16. The mobile station according to claim 14, wherein the transmission condition control unit is composed of a modulation coding scheme (MCS) control unit for determining an operation mode of the modulation processing unit in accordance with an MCS control signal outputted from the demodulation processing unit, and the MCS control unit switches the operation mode of the modulation processing unit to a predetermined low-grade operation mode in response to the TA-range-out indication signal.

* * * * *